(12) United States Patent
Heaton et al.

(10) Patent No.: US 10,956,584 B1
(45) Date of Patent: Mar. 23, 2021

(54) SECURE DATA PROCESSING

(71) Applicant: Amazon Technologies, inc., Seattle, WA (US)

(72) Inventors: Richard John Heaton, San Jose, CA (US); Randy Renfu Huang, Morgan Hill, CA (US); Ron Diamant, Albany, CA (US); David James Borland, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 16/141,770

(22) Filed: Sep. 25, 2018

(51) Int. Cl.
| | | |
|---|---|---|
| *G06F 21/00* | (2013.01) | |
| *G06F 21/60* | (2013.01) | |
| *G06N 3/08* | (2006.01) | |
| *G06F 9/38* | (2018.01) | |

(52) U.S. Cl.
CPC .......... *G06F 21/602* (2013.01); *G06F 9/3802* (2013.01); *G06N 3/08* (2013.01)

(58) Field of Classification Search
CPC ........ G06F 21/602; G06F 9/3802; G06N 3/08
See application file for complete search history.

(56) References Cited

U.S. PATENT DOCUMENTS

| | | | | |
|---|---|---|---|---|
| 2010/0023798 | A1* | 1/2010 | Meijer | G06F 11/0709 714/2 |
| 2013/0238646 | A1* | 9/2013 | Maro | G06F 21/6227 707/758 |
| 2017/0118011 | A1* | 4/2017 | Shibutani | H04L 9/0631 |
| 2018/0150741 | A1* | 5/2018 | Levi | G06N 3/0481 |
| 2018/0253641 | A1* | 9/2018 | Yachide | G06N 3/04 |
| 2018/0284735 | A1* | 10/2018 | Cella | G06K 9/6263 |
| 2019/0005375 | A1* | 1/2019 | Mody | H04L 63/0464 |
| 2019/0236049 | A1* | 8/2019 | Vantrease | G06N 3/063 |
| 2019/0392305 | A1* | 12/2019 | Gu | G06F 21/53 |
| 2020/0019843 | A1* | 1/2020 | Han | G06N 3/063 |
| 2020/0019867 | A1* | 1/2020 | Nandakumar | G06N 20/00 |
| 2020/0036510 | A1* | 1/2020 | Gomez | G06N 3/08 |
| 2020/0082259 | A1* | 3/2020 | Gu | G06N 3/08 |

* cited by examiner

*Primary Examiner* — Don G Zhao
(74) *Attorney, Agent, or Firm* — Kilpatrick Townsend & Stockton LLP

(57) ABSTRACT

Systems and methods for performing neural network processing are provided. In one example, a system comprises a neural network processor comprising: a data decryption engine that receives encrypted data and decrypts the encrypted data, the encrypted data comprising at least one of: encrypted weights data, encrypted input data, or encrypted instruction data related to a neural network model; and a computing engine that receives the weights data and perform computations of neural network processing using the input data and the weights data and based on the instruction data.

21 Claims, 17 Drawing Sheets

| Model | Model key | Weights | Weights key | Access right list |
|---|---|---|---|---|
| A0 | Model_key_A0 | Weights_x0 | Weights_key_x0 | user0, user 1 |
| A0 | Model_key_A0 | Weights_x1 | Weights_key_x1 | user2, user 3 |
| B0 | Model_key_B0 | Weights_x2 | Weights_key_x2 | user0, user4 |
| C0 | Model_key_C0 | Weights_x3 | Weights_key_x3 | user5 |

SECURE DATA PROCESSING

BACKGROUND

Artificial neural networks are computing systems with an architecture based on biological neural networks. Artificial neural networks can be trained in a training process, using training data, to learn about how to perform a certain computing task. A neural network may include a set of processing nodes connected in a particular topology. Each processing node can scale a piece of the input data using a set of weights to generate outputs, and the final decision can be generated based on a combination of the outputs of the set of processing nodes. The set of weights can generated based on the training process. The set of weights, the topology information, as well as the input data may need to be protected against authorized access.

BRIEF DESCRIPTION OF THE DRAWINGS

Various embodiments in accordance with the present disclosure will be described with reference to the drawings, in which:

FIG. 4A and FIG. 4B illustrate examples of components of the computing environment of FIG. 3, according to certain aspects of the present disclosure;

DETAILED DESCRIPTION

Figure 1:
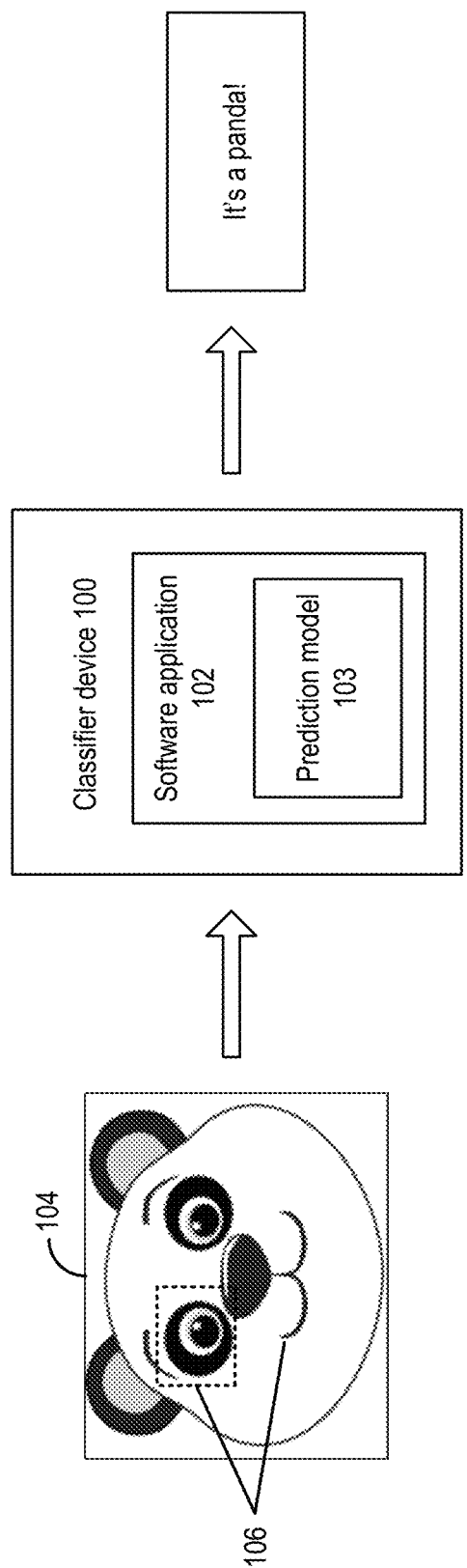
FIG. 1 illustrates an example a classifier device that uses techniques disclosed herein to process data.

Embodiments of the present disclosure relate to performing secure neural network processing operations. An environment for such embodiments may include a first memory and a neural network processor. The first memory may store encrypted weights for neural network computations. The neural network processor may include a state buffer, a data decryption engine, a computing engine, and a controller. The controller can control the state buffer to obtain the encrypted weights data from the first memory, fetch the encrypted weights data from the state buffer to the data decryption engine and decrypt, using the data decryption engine, the encrypted weights data to obtain weights data. The controller can fetch the weights data to the computing engine, and control the computing engine to perform computations of neural network processing based on input data and the weights data.

In some examples, the decryption of the weights data can be performed in a just-in-time (JIT) manner. For example, the computing engine may consume weights data in batches to perform a sequence of neural network computations. The encrypted weights data can also be decrypted also in batches (e.g., in response to receiving an instruction to fetch a particular portion of weights data to the computing engine), such that the portion of the encrypted weights data is decrypted only when the computing engine is ready to consume the portion.

In addition, besides the weights data, the input data as well as instructions that control the sequence of the neural network computations at the computing engine (which may reflect the topology of a neural network) can also be encrypted. The encryption can be based on keys that are provided by one or more entities that provide the weights data, the input data, and the neural network model.

In some examples, the environment may provide a secure key storage for the keys, as well as a database to store encrypted weights data and encrypted information about a plurality of neural network models. The environment may further include a security manager that can obtain the keys from the one or more entities and store the keys at the secure key storage. The environment may further include an access manager that regulate accesses to the weights data, the input data, and neural network models data by controlling the distribution of the keys, as well as the distribution of the weights data, the input data, and neural network models data, to the neural network processor, to enable (or disable) the use of certain weights data, input data, and neural network models data for neural network computations.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum. The intermediate outputs from each processing node of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold. Due to the combination of scaled elements between layers, the sizes of the higher layers (e.g., the output layer, the intermediate layers immediately before the output layer, etc.) typically are smaller than the sizes of the lower layers (e.g., the input layer, the intermediate layers immediately after the input layer, etc.).

A neural network processor can be programmed to perform computations based on an artificial neural network model. A neural network processor can be programmed based on a sequence of instructions that include computation operations (e.g., adding, multiplication, processing of activation function, etc.) associated with the model. The instructions may also access internal and external memory devices to obtain and store data. A compiler may receive information about the neural network model, the input data, and the available memory and computation resources, and generate the set of instructions to indicate, for example, when to access the internal and external memory devices for the data, which component of the neural network processor to perform computations on the data based on the neural network model, etc., to perform the neural network processing. The compiler may generate the set of instructions upon receiving a request (e.g., from a host device) to perform the neural network processing, and provide the set of instructions to the neural network processor for execution. The neural network processor can be programmed differently to, for example, apply different neural network models, to process different input data, etc., for different neural network processing operations.

The neural network processor can be part of a multi-tenant compute service system which can be implemented on a cloud computing environment to provide various services to a plurality of clients over a network. For example, the cloud computing environment can provide resources for image recognition services, speech recognition services, etc., to different clients, and the neural network processor (or other neural network processors) can provide computing resources to enable these services. The cloud computing environment can also store neural network models information (e.g., information that defines different neural network topologies), weights data, and input data, and provide the information and data to the neural network processor to perform neural network processing to enable these services upon receiving requests from the clients.

The weights data, neural network models information, as well as input data, may need to be protected against unauthorized access. For example, the weights data and the neural network models may be developed by a vendor. The neural network models and weights data may be proprietary information for the vendor, and different vendors may have their proprietary neural network models and/or weights data. As another example, the input data (e.g., image and audio data) may include personal or otherwise sensitive information. But when these information are stored in a cloud computing environment accessible to many users, the information may be subject to unauthorized accesses by the clients of the cloud computing environment, or by other network users.

The embodiments of the present disclosure can improve the security of neural network processing, especially in a multi-tenant or cloud computing environment. For example, the weights data, input data, as well as neural network models information can be in encrypted form when they are transmitted within the cloud computing environment, to avoid the data being intercepted and accessed by unauthorized parties while the data are being transmitted. Moreover, after transmitting the encrypted data to the neural network processor, the encrypted data are decrypted in a just-in-time fashion such that a piece of data is decrypted only when the piece of data is needed (e.g., to execute a new instruction, to fetch a new set of input data and weights data to start a new computation, etc.). The likelihood of exposing the decrypted data to unauthorized or malicious users can be reduced as a result. Moreover, to further enhance security, a centralized entity (e.g., a security manager) can obtain the keys in encrypted form, and store the keys at secure memory devices to prevent unauthorized access to the keys. Further, the centralized entity is responsible for distributing the keys directly to the neural network processor(s) designated to perform the neural network computations for a client device, after authenticating the client device and the approving the neural network processing request from the client device. The client devices are not provided with access to the keys, to reduce the likelihood that unauthorized users gain access to the keys. All these can improve the security protection of input data, weights data, and the neural network models information against unauthorized access.

In the description herein, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a pre-determined function based on the prediction. For example, classifier device 100 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it and decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of pre-determined features data. The pre-determined features data may include data associated with a set of pre-determined visual image features such as, for example, a nose object, a mouth object, etc. The pre-determined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provide examples of techniques to allow allocation and placement of resources for deployment of prediction model 103 to be performed at different times and by different systems, which can expedite the operations of software application 102, as to be discussed below.

Figure 2A:
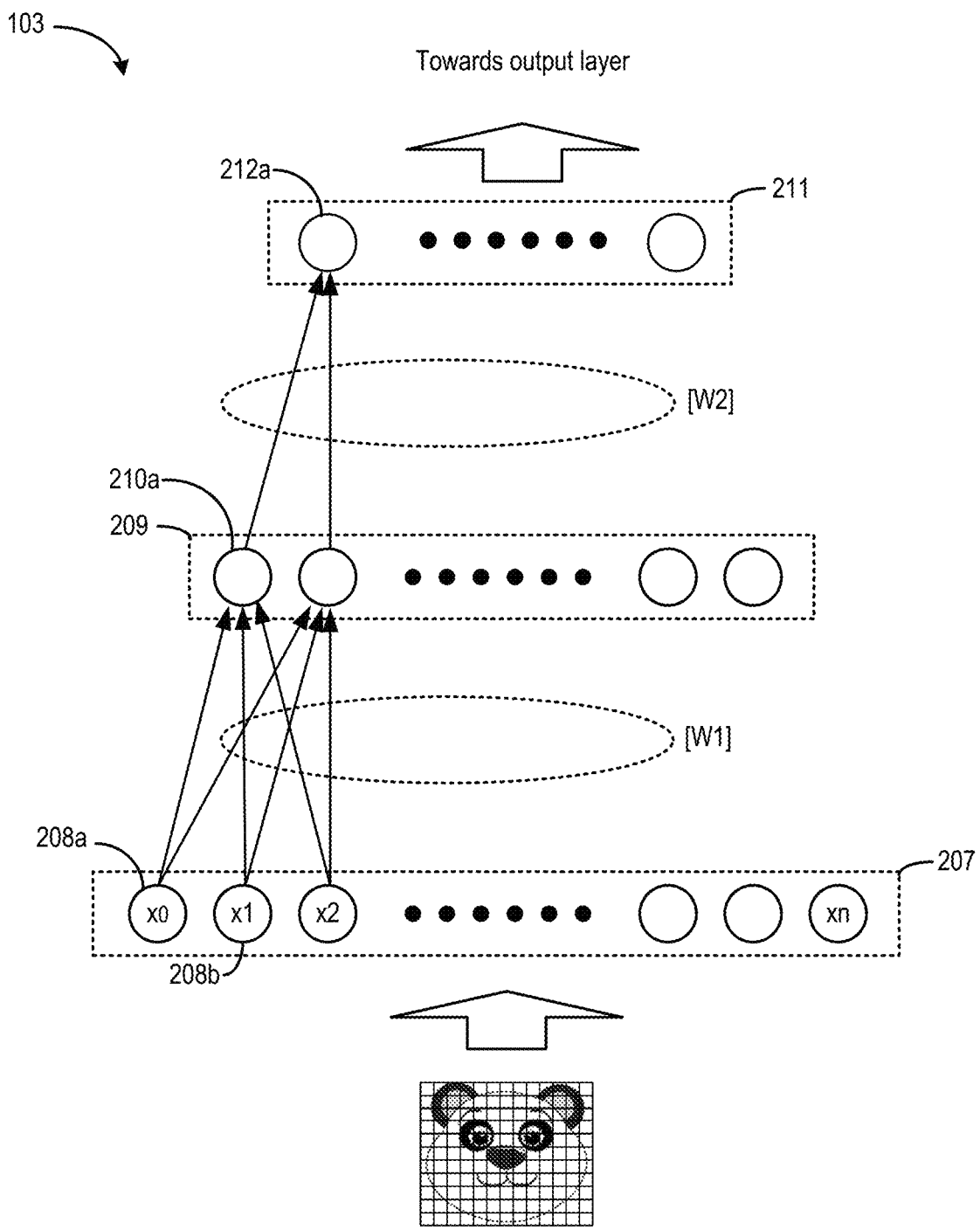
FIGS. 2A-2E are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet, etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, . . . $x_n$) corresponding to a pre-determined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \quad \text{(Equation 1)}$$

Here, $\text{sum}_{210a}$ represents a sum generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1).

Figure 2B:
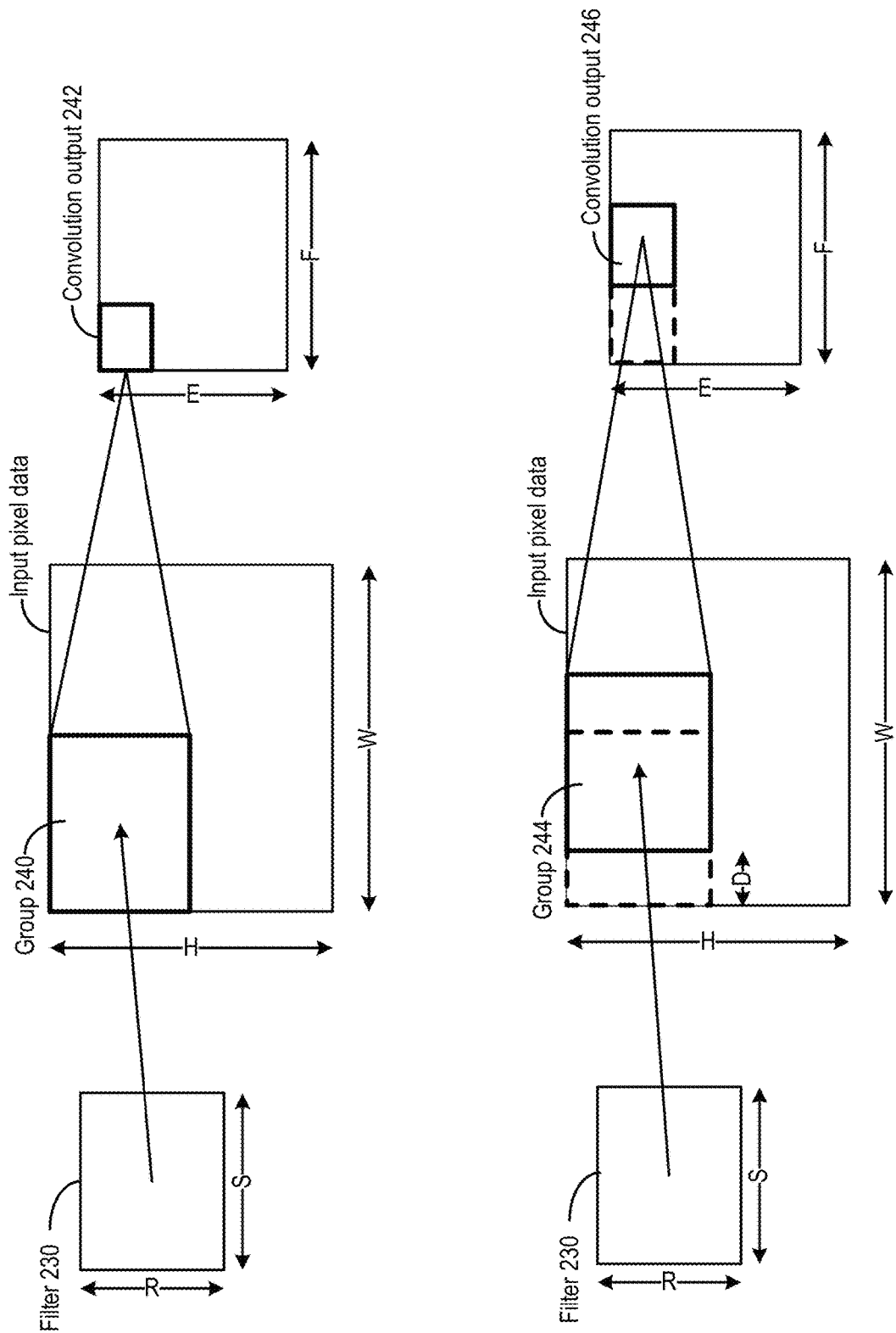

In a case where prediction model 103 is a CNN, each processing node of layer 209 may generate the sum based on the scaling of pixel values from a group of processing nodes of layers 207. The sum may represent a convolution result between a group of pixel values and a filter comprising the weight values. FIG. 2B illustrates an example of a convolution operation layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operations, such that the block of pixels corresponding to group 244 may be situated at a distance D (in terms of pixels) from the block of pixels corresponding to group 240, and the next block of pixels may also be situated at the same distance D from group 244. Other processing node of layer 209 may also receive groups of pixels corresponding to other rectangular blocks and generate other intermediate outputs. The convolution outputs can be part of a convolution output array 280 with a height of E rows and a width of F columns. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Figure 2C:
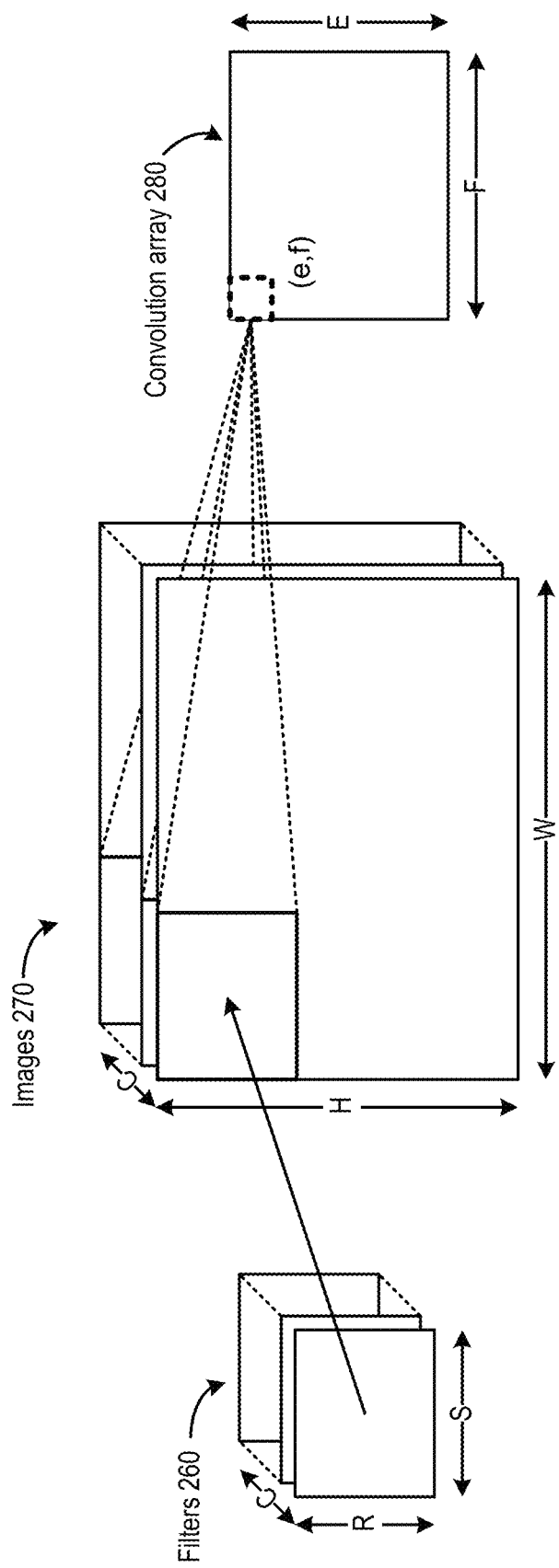

In some examples, the convolution operations can be performed between multiple images and multiple filters. For example, referring to FIG. 2C, a set of C filters 260 may corresponds to a number (C) of images 270, and convolution operations can be performed between each filter of the set of filters 260 and blocks of pixels on the corresponding image of images 270. The convolution results for each filter-image pair can be summed to generate a convolution output as follows:

$$O_{e,f} = \Sigma_{r=0}^{R-1} \Sigma_{s=0}^{S-1} \Sigma_{c=0}^{C-1} X^c_{eD+r,fD+s} \times W^c_{r,s} \quad \text{(Equation 2)}$$

Here, the convolution operation involves the images (or pixel arrays). $X^c_{eD+r,fD+s}$ may refer to the value of a pixel at an image of index c, within the number (C) of images 270, with a horizontal pixel coordinate of eD+r and a vertical pixel coordinate of fD+s. D is the sliding-window stride distance, whereas e and f correspond to the location of the output in the convolution output array, which can also correspond to a particular sliding window. Further, r and s correspond to a particular location within the sliding window. A pixel at an (r, s) location and of an image of index c can also correspond to a weight $W^c_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the image within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. For example, the multiple sets of filters may correspond to multiple features to be detected from the set of images, and each convolution output array may correspond to the detection results for each feature from the set of images. For example, where M sets of filters are applied to C images to generate M convolution output arrays, Equation 2 can be updated as follows:

$$O_{e,f}^m = \Sigma_{r=0}^{R-1} \Sigma_{s=0}^{S-1} \Sigma_{c=0}^{C-1} X^c_{eD+r,fD+s} \times W^{c,m}_{r,s} \quad \text{(Equation 3)}$$

Here, convolution output $O_{e,f}^m$ and weight $W^{c,m}_{r,s}$ has an index m corresponding to one of the M sets of filters.

Figure 2D:
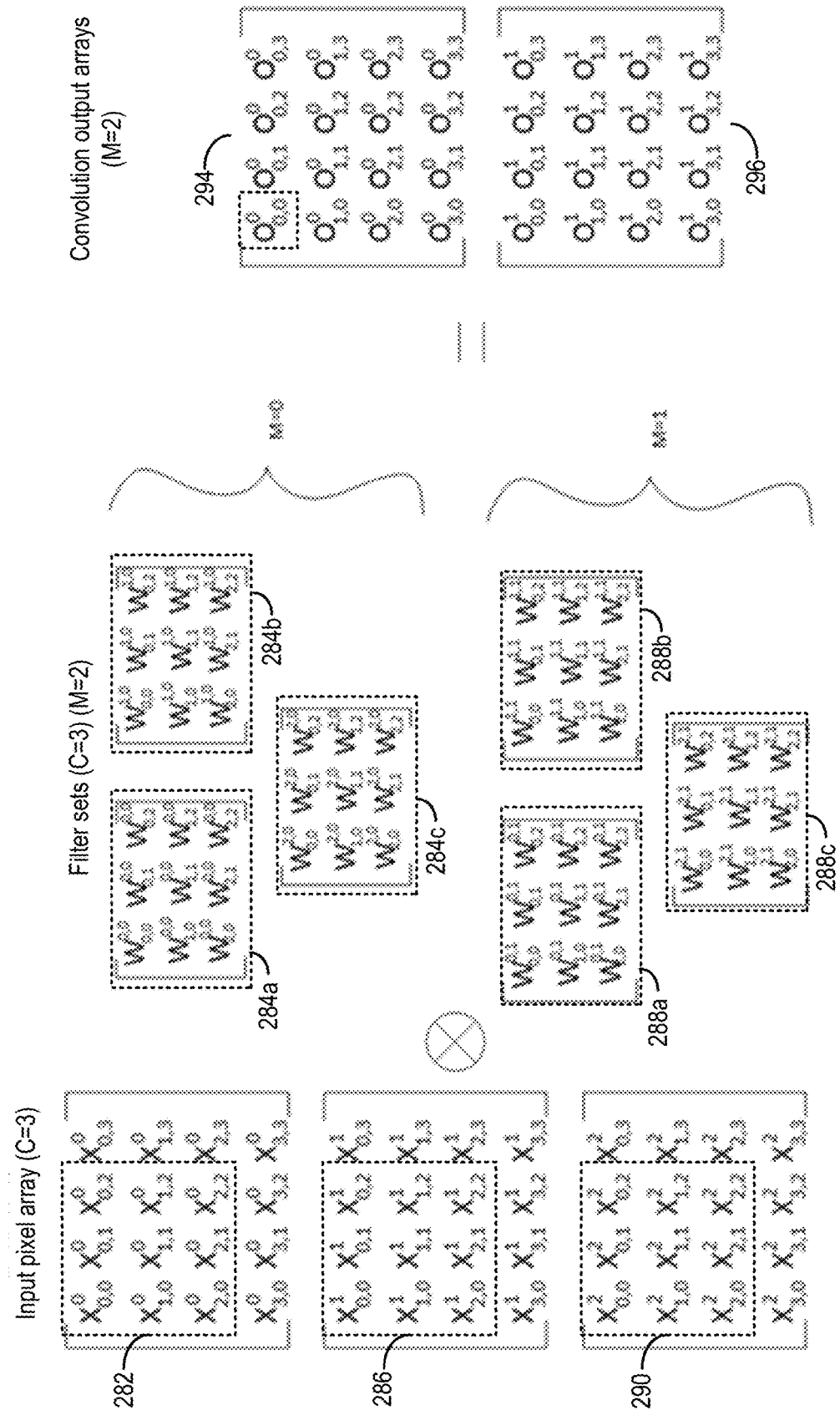

FIG. 2D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data sets, with each output data set corresponding to a convolution output array. Each convolution output array corresponds to convolving one set (of the M sets) of filters with the input pixel arrays. For example, $O_{0,0}^0$ can be generated by a sum of the dot-product between group of pixels 282 and filter array 284, the dot-product between group of pixels 286 and filter array 288, and the dot-product between group of pixels 290 and filter array 292.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLu) defined according to the following equation:

$$\text{ReLu}(y) = \max(0, y) \quad \text{(Equation 4)}$$

A processing node of layer 209 (e.g., processing node 210a) may process the sum with the ReLu function to generate a first intermediate output based on the following equation:

$$\text{first\_intermediate\_output}_{210a} = \text{ReLu}(\text{Sum}_{210a}) \quad \text{(Equation 5)}$$

In a case where prediction model 103 is a CNN, prediction model 103 may include a pooling layer (not shown in FIG. 2A) to reduce the size of the first intermediate outputs. For example, the pooling layer may perform a down-sampling operation and forward a maximum intermediate output (generated based on the ReLu function) among a group of intermediate outputs (while discarding the rest of the intermediate outputs in the group) to layer 211.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 2E:
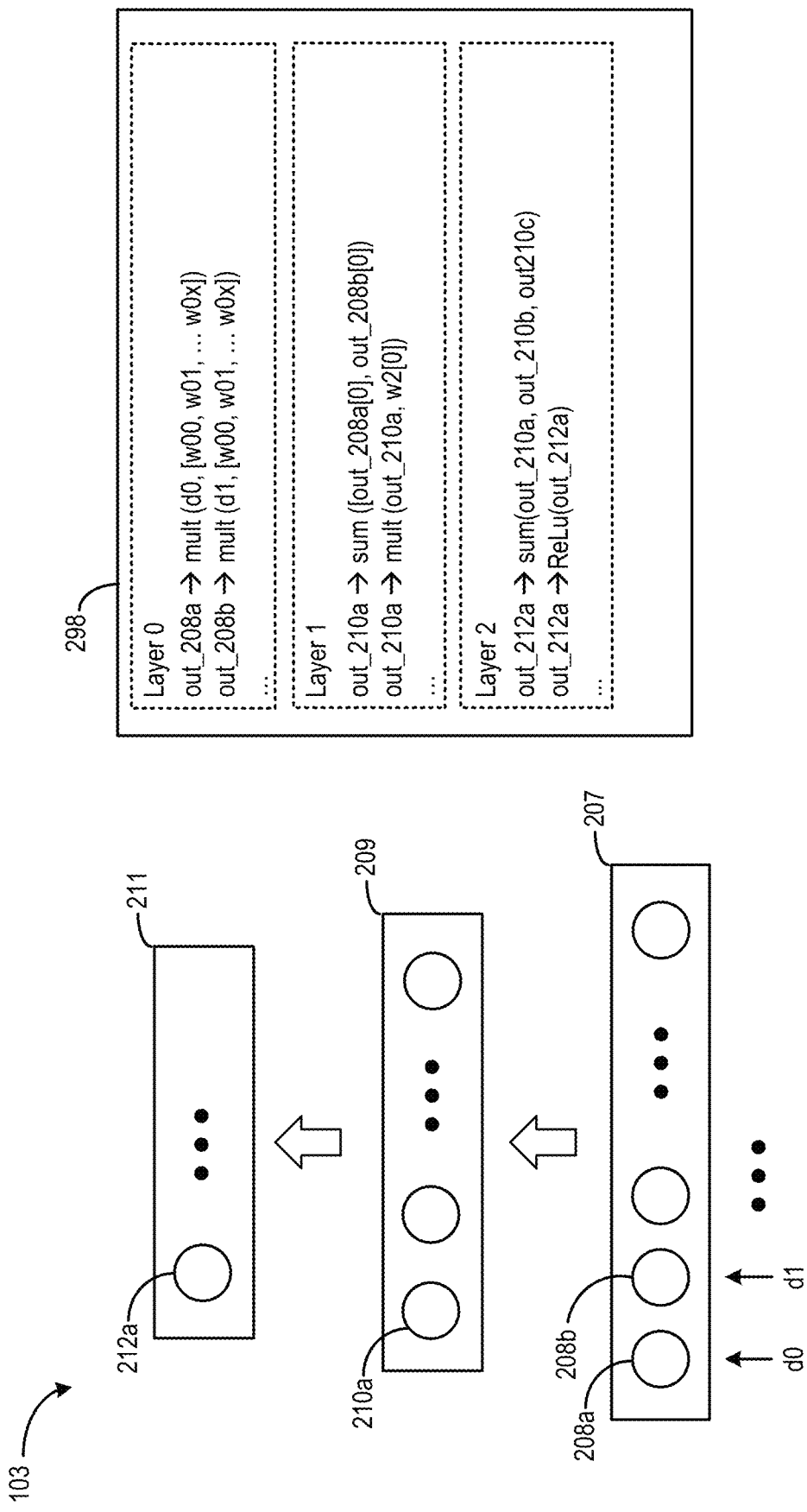

In some examples, the topology of a neural network model (e.g., model 103 of FIG. 2A) can be represented by a set of instructions which can define, for example, a sequence of computations at each processing node of each neural network layer, the flow of intermediate output data between each neural network layer, etc. FIG. 2E illustrates an example of instructions 298 that can represent model 103 of FIG. 2A. As shown in FIG. 2E, instructions 298 includes a section for neural network layer 0, a section for neural network layer 1, and a section for neural network layer 2. Layer 0 is to be executed first, followed by layer 1, and then followed by layer 2. Each section also defines the neural network computations for a processing node of a neural network layer. For example, at layer 0, node 208a performs neural network computations by multiplying input data element d0 with a set of weights (w00, w01, . . . ) to generate an array of outputs ("out_208a"), whereas node 208b performs neural network computations by multiplying input data element d1 with a set of weights (w00, w01, . . . ) to generate an array of outputs ("out_208b"). After the computations at layer 0 complete, the computations for layer 1 may proceed. In this topology, node 210a of layer 1 receives one output data element of the array of outputs from node 208a ("out_208a[0]") and one output data element of the array of outputs from node 208b ("out_208b[0]"), sum the two output data elements, and multiply the sum with a weight ("w2[0]") to generate an output ("out 210a"). After the computations at layer 1 complete, the computations for layer 2 may proceed. In this topology, node 212a of layer 2 receives outputs from a group of three nodes of layer 1 ("out 210a", "out 210b", and "out 210c"), sum them, and apply ReLu function to the sum to generate an output ("out 212a").

Instructions 298 can provide a generic description of the topology of a neural network model, as well as the sequence of neural network computations associated with the model. Instructions 298 can also define the size and format of weights data for each layer, as well as the size and format of input data. Instructions 298 can be processed by a compiler, which can translate instructions 298 into instructions that are specific to and executable by a neural network processor. For example, the compiler can obtain information about the architecture of a neural network processor to be used to perform neural network computations based on the model, and can generate a set of instructions which are specific for the neural network processor architecture and which also reflect the sequence of neural network computations in instructions 298. The set of instructions may also include other non-computation operations, such as movement of data involving the memory devices internal or external to the neural network processor to support the sequence of neural network computations.

Figure 3:
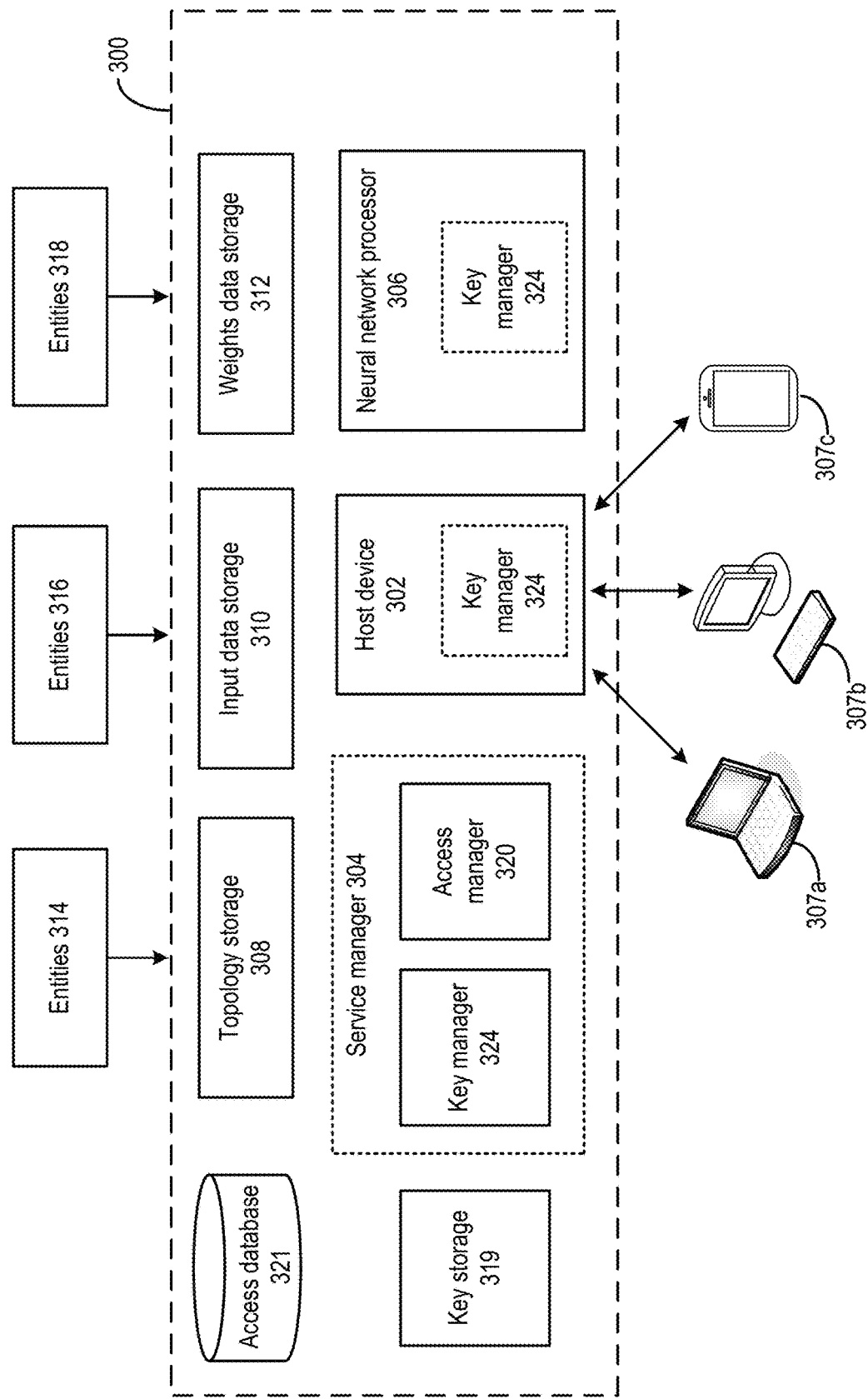
FIG. 3 illustrates an example of a computing environment, according to certain aspects of the present disclosure.

FIG. 3 shows a computing environment 300 according to some embodiments of the present disclosure. Environment 300 may include multiple computing systems interconnected with one or more networks (not shown in FIG. 3) to form a cloud computing environment. Environment 300 may be part of a multi-tenant compute service system to provide computing and memory resources for a computing service. For example, referring back to FIG. 1, environment 300 may provide computing and memory resources for computations with prediction model 103.

Computing environment 300 may include a host device 302, a service manager 304, a neural network processor 306, and memory/storage devices including, for example, topology storage 308, input data storage 310, and weights data storage 312. Host device 302 can include one or more servers, possible located in one or more data centers. and can interface with client devices (e.g., client devices 307a, 307b, 307c, etc.) to receive instructions from the client devices for certain compute services (e.g., data classification service, inference service, model training, etc.), and operate with other components of computing environment 300 (e.g., service manger 304, neural network processor 306, etc.) to perform operations to provide the compute services. In some examples, host device 302, service manager 304, neural network processor 306, and memory/storage devices 308, 310, and 312 can be standalone devices interconnected by one or more networks (not shown in FIG. 3) and located in different locales to form a cloud infrastructure. In some examples, host device 302 and neural network processor 306 can be part of a server, whereas service manager 304 is hosted in another server, whereas topology storage 308, input data storage 310, and weights data storage 312 can be network storage devices.

Host device 302 can operate software applications (e.g., software application 102) to provide the service. Host device 302 can also use computing and memory resources of computing environment 300, including neural network processor 306, to perform computations (e.g., neural network computations) to provide the service. For example, host device 302 can operate software application 102. Host device 302 may receive an instruction from the software application (e.g., via an Application Programming Interface (API)) and, responsive to the instruction, control neural network processor 306 to perform neural network computations on pixel data of an input image using prediction model 103. Based on the output of the neural network computations, software application 102 can determine whether the input image includes a pre-determined object. Host device 302 may also host a compiler which can generate instructions specific to neural network processor 306. The instructions may be generated based topology information of a neural network model to be used (e.g., instructions 298 of FIG. 2E). Host device 302 can provide the instructions to neural network processor 306 to perform the neural network computations.

Neural network processor 306 may obtain input data, weights data, and data about prediction model 103 (e.g., a topology of a neural network model) prior to performing the neural network computations. Neural network processor 306 may obtain input data (e.g., pixel data of an input image) from input data storage 310, and weights data from weights data storage 312. In addition, host device 302 can also obtain topology data (e.g., instructions 298) from topology storage 308, process the topology information to generate instructions specific to neural network processor 306, and provide the instructions to neural network processor 306.

To improve security and to prevent authorized access, the input data, weights data, and topology information stored on, respectively, input data storage 310, weights data storage 312, and topology storage 308 can be encrypted. The encrypted input data, weights data, and topology data can be received from devices associated with multiple data providers/entities (e.g., users, companies, organizations, etc.). Each data provider can encrypt the data with an encryption key, and provide the encrypted data for storage at computing environment 300. The encryption key can be a symmetric encryption key based on a block cipher algorithm including, for example, Advanced Encryption Standard (AES).For example, entities 314 may store encrypted topology data (e.g., encrypted instructions 298) for neural network models at topology storage 308. Entities 316 may store encrypted input data (e.g., input images, audio files, etc.) at input data storage 310. Entities 318 may store encrypted weights data at weights data storage 312. In addition, entities 314, 316, and 318 can also provide the encryption keys used to encrypt the topology data, the input data, and the weights data to computing environment 300, which can store the encryption keys for future decryption. Such arrangements can improve the speed of neural network processing by, for example, reducing or eliminating additional interactions with the entities to request for the encryption keys to enable usage of the encrypted topology data, the input data, and the weights data for the neural network processing.

Computing environment 300 may include a key storage 319 to store the encryption keys. To further enhance security, key storage 319 can be implemented on a secure memory device (e.g., a memory device that is compliant to the Federal Information Processing Standard Publication 140-2 (FIPS PUB 140-2), and may automatically delete and/or destroy the encryption keys stored in the memory device upon detecting, for example, unauthorized access requests to the memory device and/or activities to temper with the memory device. The secure memory device used for key storage 319 include any suitable memory including, for example, dynamic random access memory (DRAM), synchronous DRAM (SDRAM), double data rate DRAM (DDR DRAM), storage class memory (SCM), flash memory devices, etc. In some examples, the private key encryption keys stored in key storage 319 can also be encrypted using a private key of service manager 304, as to be described in more details below.

Service manager 304 can manage the provision of compute services to client devices (e.g., client devices 306a, 306b, and 306c). The management may include, for example, managing the access to the topology data, the input data, and the weights data by host device 302 and neural network processor 306 in providing neural network processing services, which can be performed by access manager 320. Access manager 320 can maintain an access database 321 which can provide a mapping among the neural network model topologies, the weights data and input data (e.g., based on whether the weights data and the input data conform with the size and format required for a particular topology), the encryption keys, and access right information. As to be described below, access manager 320 can manage the access to the topology data, the input data, and the weights data in topology storage 308, input data storage 310, and weights data storage 312 based on the information stored in access database 321.

In some examples, computing environment 300 may be used to provide or foster a marketplace for neural network processing service, in which different vendors can sell or market different components of a neural network processing service. The components can include neural network models (represented by topology data) and weights. A user can select the components of the neural network processing service from different vendors, and use computing and memory resources provided by computing environment 300 (which may be operated/managed by a different vendor from those which provide the neural network models and weights) to perform neural network operations to receive the service. For example, a user operating client device 307a may want to perform image recognition on a set of image data using computing environment 300 operated by a vendor A. The user can interface with service manager 304, to select a neural network model provided by a vendor B and a set of weights data provided by a vendor C, and use the image data, neural network model, and weights data with host device 302 and neural network processor 306 to perform the image recognition task. Such a marketplace substantially increases the flexibility of neural network operations and encourages improvements and advances in neural network technology. For example, a system can be created in which different vendors can be incentivized to improve the neural network models and weights to improve, for example, the accuracy and/or speed of neural network processing, and to share their improvements with the consumers. Compared with a case where a single vendor owns every component of neural network processing (including the model, the weights, and the computing/memory resources), such a marketplace can foster more innovations in neural network processing, which can in turn provide customers with better user experiences.

The capability of storing and transmitting the neural network model data, weights data, as well as input data in encrypted form, and decrypting the data only when the data is consumed by host device 302 and/or neural network processor 306, enhance the security of storage of these data. The enhanced security can ensure that the proprietary model and weights data from different vendors are protected against unauthorized access, use, and tampering in computing environment 300. Such assurance can be critical in the proper functioning of a marketplace for neural network processing service involving multiple vendors.

FIG. 4A illustrates an example of a data structure 400 of access database 321. As shown in FIG. 4A, data structure 400 may be in the form of a table and include multiple columns for different information. For example, column 402 can store identifiers (e.g., "A0", "B0", "C0", etc.) of neural network models. Column 404 can store identifiers (e.g., "model_key_A0", "model_key_B0", model_key_C0", etc.) of encryption keys for decrypting the topology data of corresponding neural network models within the same row (e.g., a encryption key having an identifier "model_key_A0" corresponds to a neural network model "A0"). Column 406 can store identifiers (e.g., "weights_x0", "weights_x1", "weights_x2", "weights_x3", etc.) of weights data. Column 408 can store identifiers (e.g., "weights_key_x0", "weights_key_x1", "weights_key_x2", "weights_key_x3", etc.) of encryption keys for decrypting the corresponding weights data within the same row (e.g., a encryption key having an identifier "weights_key_x0" corresponds to weights data "weights_x0"). The identifiers can take in any forms and may include, for example, identifiers for locations of storages (e.g., storage locations in topology storage 308, input data storage 310, weights data storage 312, and key storage 319). Each entry of column 414 can store a set of users having access right to the neural network model, input data, and weights data of the same row. For example, a user having an identifier "user0" has access to model A0, input data "input_data_y0", and weights data "weights_x0" as well as model B0, input data "input_data_y0", and weights data "weights_x2". The access right information can be derived from account information of the users which can indicate, for example, whether the users have purchased or otherwise granted the access right to the models, weights data, and input data.

Although FIG. 4A illustrates that both the topology data and the weights are encrypted, it is understood that in some cases only one of the topology data or the weights are encrypted. In such a case, data structure 400 may associate access right information of column 414 with the encrypted topology data or the encrypted weights, and the encryption key information for decrypting the encrypted information. In some examples, separate data structures may also be provided to associate the storage locations of the encrypted input data and the storage locations of the encryption keys for decrypting the encrypted input data, and the storage locations information can be provided to neural network processor 306, so that the processor can obtain the encrypted input data and decrypt the encrypted input data to perform neural network processing.

Referring back to FIG. 3, access manager 320 can interface with a client device (e.g., client device 306a) via host device 302. Access manager 320 can provide a list of neural network topologies and weights sets to process a set of input data for selection to the client device and receive a selection. The list can be determined based on access rights information of column 414 of access database 321. For example, in a case where client device 306a is associated with user "user0", access manager 320 can provide a list of neural network models A0 and B0, weights data x0 and x2, and input data y0 for selection. Upon receiving a selection (e.g., using neural network model A0 and weights data x0 to process input data y0), access manager 320 can provide the host device 302 and/or neural network processor 306 access to the selected neural network topology, weights data, and input data. For example, access manager 320 can retrieve an encrypted instruction file (e.g., containing instructions similar to those of instructions 298) from topology storage 308 for neural network model A0, input data "input_data_y0" from input data storage 310, weights data "weights_data_x0" from weights data storage 312, and the corresponding encryption keys "model_key_A0", "weights_key_x0", and "input_key_y0" from key storage 319. Access manager 320 can transfer the encrypted instruction file of the selected model and the corresponding encryption key to host device 302. Access manager 320 can also transfer the selected encrypted weights data and encrypted input data to neural network processor 306. Access manager 320 can also transmit the encryption keys along with the encrypted weights data, input data, and topology data, to enable host device 302 and neural network processor 306 to decrypt the encrypted data for consumption.

Figure 4B:
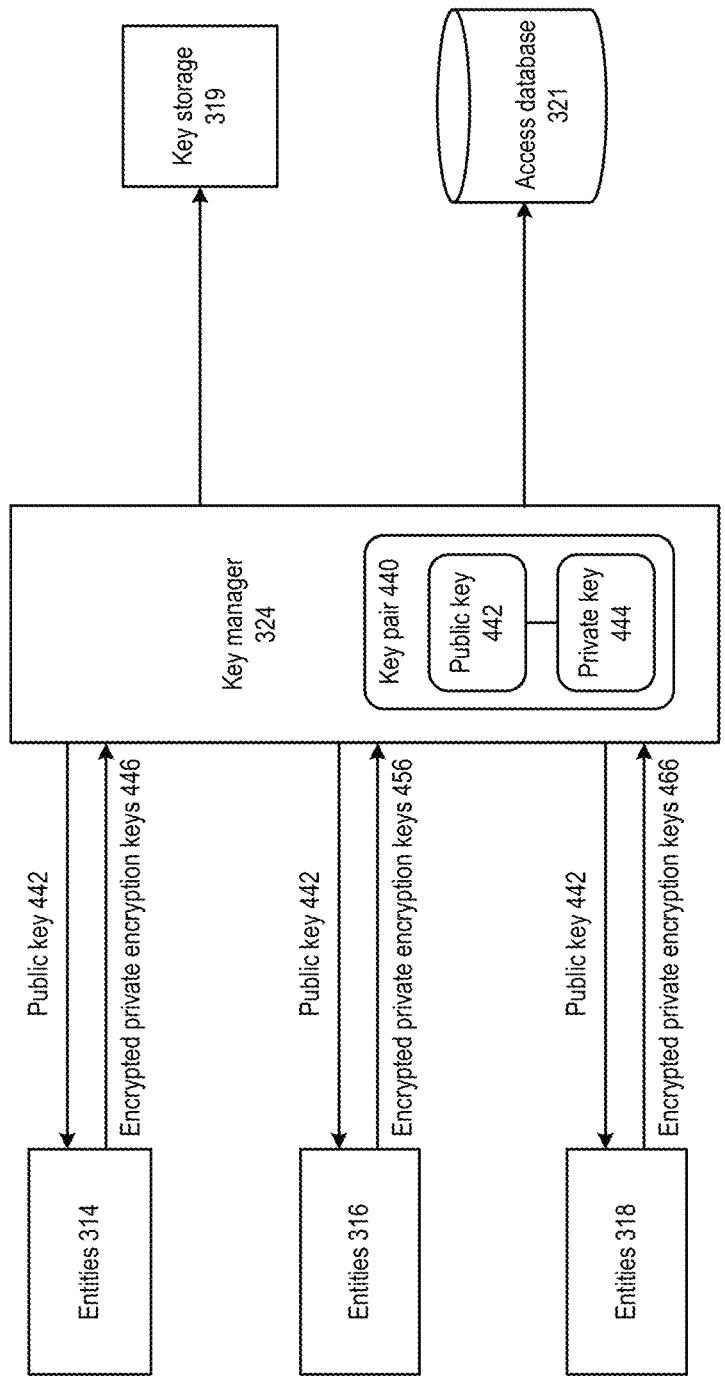

Service manager 304 further includes a key manager 324 that manages the acquisition storage, as well as access of the encryption keys at key storage 319. Key manager 324 may interface with entities 314, 316, and 318 to obtain the encryption keys. In some examples, to reduce the likelihood of the encryption keys being intercepted, key manager 324 may obtain the encryption keys from the entities via a secure transfer process based on asymmetric transactions. FIG. 4B illustrates an example of the secure transactions between key manager 324 and entities 314, 316, and 318. As shown in FIG. 4B, key manager 324 can maintain a key pair 440 including a public key 442 and a private key 444. As part of the secure transactions, key manager 324 can transmit public key 442 to each of entities 314, 316, and 318. Entities 314, 316, and 318 can encrypt the encryption keys for weights data, input data, and topology data using public key 442, and transmit the encrypted encryption keys to key manager 324. For example, entities 314 can transmit encrypted encryption keys 446 for decrypting topology data to key manager 324. Entities 316 can transmit encrypted encryption keys 456 for decrypting encrypted input data to key manager 324. Entities 318 can transmit encrypted encryption keys 466 for decrypting encrypted weights data to key manager 324. Key manager 324 can store encrypted encryption keys 446, 456, and 466 at key storage 319. In addition, key managers 324 can also update access database 321 by, for example, associating the encrypted encryption keys (e.g., identifiers, storage locations in key storage 319, etc.) with the models, weights, and input data in data structure 400.

Key manager 324 can also operate with access manager 320 to manage access of the encryption keys by host device 302 and/or neural network processor 306. For example, upon receiving a selection from a client device for a neural network model, input data, and weights data, access manager 320 can refer to access database 321 and can request for the encryption keys (e.g., by providing their identifiers, their storage locations, etc.) from key manager 324. Key manager 324 can retrieve the encrypted encryption keys from key storage 319, decrypt the encrypted encryption keys, and provide the decrypted keys to access manager 320. Access manager 320 can then transmit the selected encrypted neural network model topology data, input data, and weights data, as well as the decrypted keys, to host device 302 and/or neural network processor 306, which can then decrypt the encrypted neural network model topology data, input data, and weights data to support the neural network processing. In some examples, key manager 324 can also be part of host device 302 and/or neural network processor 306, which can interface directly with entities 314-318 to obtain the encrypted encryption keys. In some examples, key manager 324 can be part of a cloud service provider. For example, computing environment 300 can be Amazon Web Services Cloud, whereas key manager 324 can be part of Amazon Key Management Service.

Figure 5A:
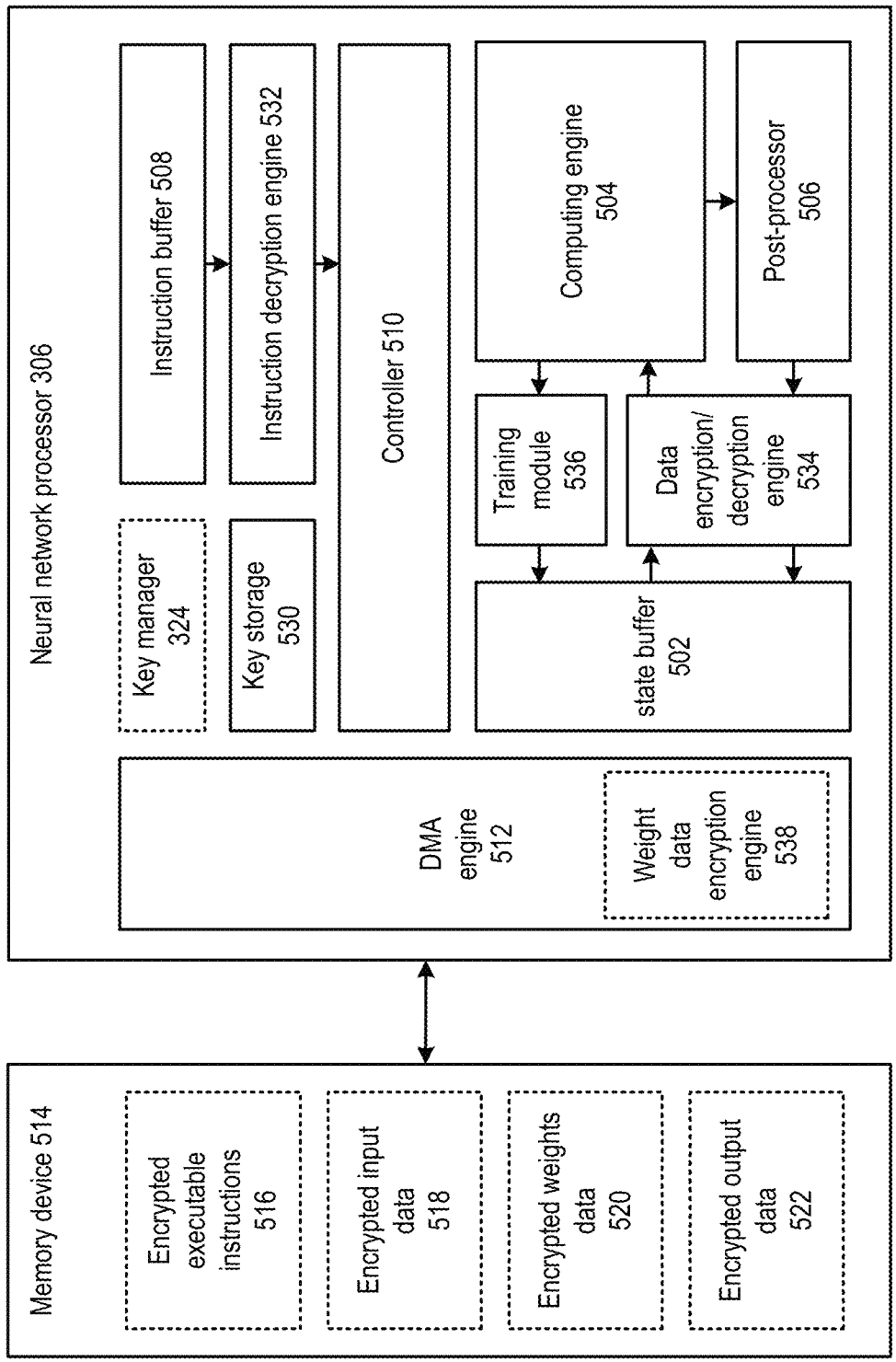
FIG. 5A and FIG. 5B illustrate examples of a neural network processor of the computing environment of FIG. 3, according to certain aspects of the present disclosure.
Figure 5B:
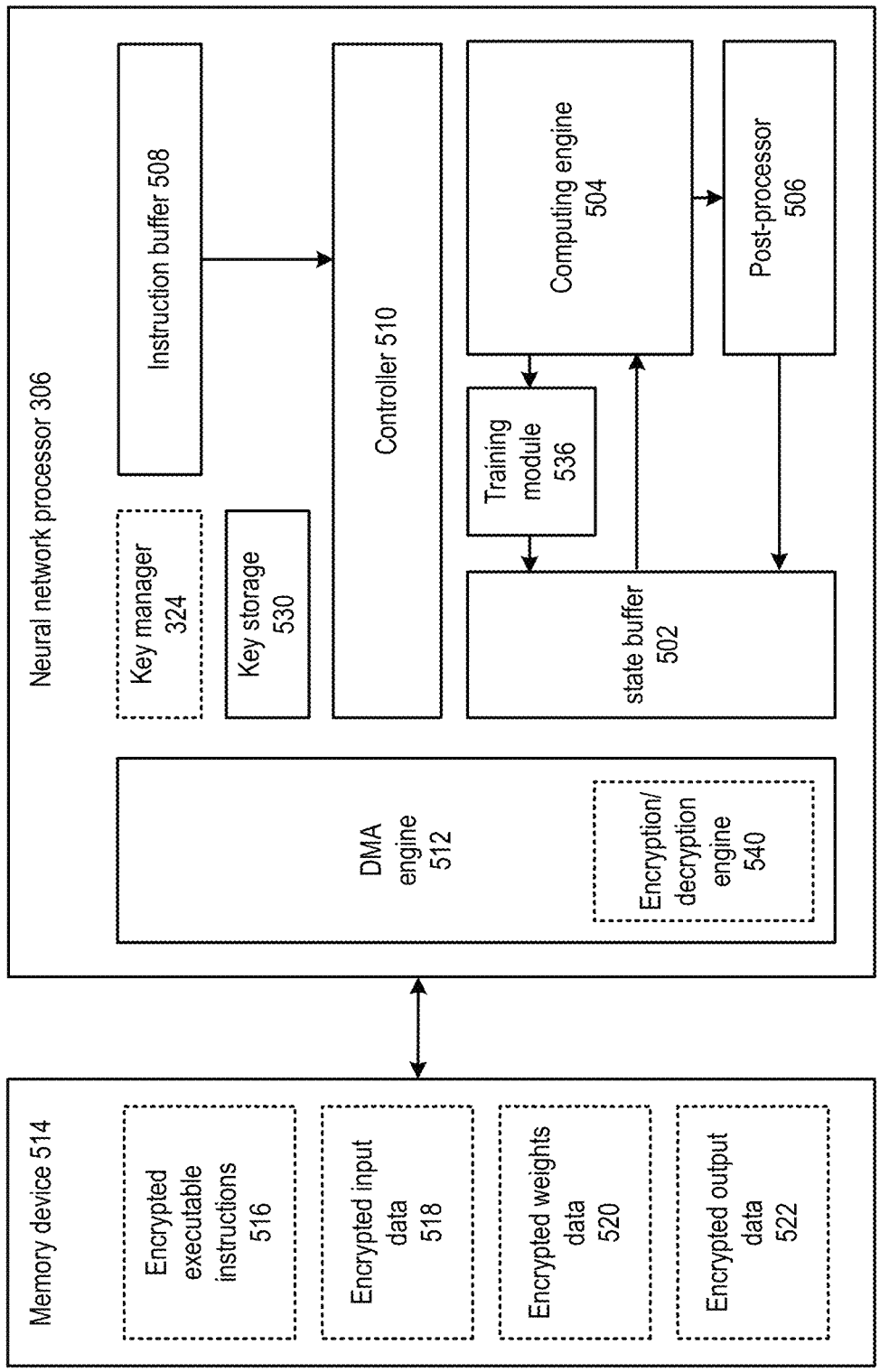

FIG. 5A and FIG. 5B illustrate examples of neural network processor 306. Neural network processor 306 can provide the computing resources to perform neural network computations, and FIG. 5A and FIG. 5B illustrate different data encryption/decryption arrangements within neural network processor 306 based on different pre-determined trust boundaries.

As shown in FIG. 5A and FIG. 5B, neural network processor 306 may include a state buffer 502, a computing engine 504, and a post-processor 506. State buffer 502 may include on-chip memory device and may include, for example, static random access memory (SRAM) to provide internal memory to store input data, weights data, and output data to support computations at computing engine 504. Computing engine 504 may include an array of processing elements to perform arithmetic operations for a neural network operation (e.g., a convolution operation) as described above. For example, each processing element may include arithmetic circuits (e.g., adders, multipliers, etc.) to perform addition and multiplication operations, and each column of processing elements can generate a partial sum of products of input data and weights data. State buffer 502 may be configured to provide caching of data (e.g., input data, weights data, output data, etc.) used for computations at computing engine 504, to reduce the effect of memory access bottleneck on the performance of computing engine 504. State buffer 502 may include rows of storage elements, with a row of storage elements configured to store input data and output data generated by a corresponding row of processing elements of computing engine 504. Post-processor 506 may include circuitries to perform processing of output of computing engine 504 including, for example, accumulation of partial sums for each column of computing engine 504 to generate an output for each column. Post-processor 506 may apply one or more activation functions (e.g., ReLu function) and/or other types of post-processing (e.g., pooling) on the output, and store the results of the post-processing at state buffer 502.

Neural network processor 306 may also comprise a direct memory access (DMA) engine 512 for accessing an external access memory device 514. Memory device 514 may store encrypted executable instructions 516, encrypted input data 518, encrypted weights 520, as well as encrypted output data 522. As to be described in more details below, encrypted executable instructions 516 may be generated by a compiler (e.g., hosted by host device 302, or hosted in other machines/devices) based on compiling neural network model topology data (e.g., in the form of instruction file 298) from topology storage 308. Encrypted input data 518 may be obtained from input data storage 310, whereas encrypted weights 520 may be obtained from weights data storage 312. Encrypted executable instructions 516, encrypted input data 518, and encrypted weights data 520 can be stored at memory device 514 based on a selection from a user for a particular combination of a neural network model, input data, and weights data received by access manager 320, as described above. Encrypted output data 522 can represent a result of neural network processing by prediction model 102 (generated by computations at computing engine 504 and post-processing by post-processor 506) to be provided back to software application 102. Memory device 514 may include any suitable memory, e.g., dynamic random access memory (DRAM), synchronous DRAM (SDRAM), double data rate DRAM (DDR DRAM), storage class memory (SCM), flash memory devices, etc. In some examples, neural network processor 306 can be part of an integrated circuit (e.g., a system-on-chip (SoC)) that is electrically connected with memory device 514 with high speed interconnects of, for example, Peripheral Component Interconnect (PCI) based protocols.

In addition, computing engine 504 further includes one or more instruction buffers 508 and a controller 510. Instruction buffers 508 may include an on-chip memory device such as, for example, static random access memory (SRAM), and can store encrypted executable instructions 516 fetched from memory device 514. In some examples, one or more instruction buffers 508 may include multiple instruction buffers, with each instruction buffer holding instructions for, respectively, state buffer 502, computing engine 504, and post-processor 506. Controller 510 can fetch the instructions from instruction buffers 508, and execute the instructions to control the operations at state buffer 502, computing engine 504, and post-processor 506, as well as the flow of data between these components.

Figure 6:
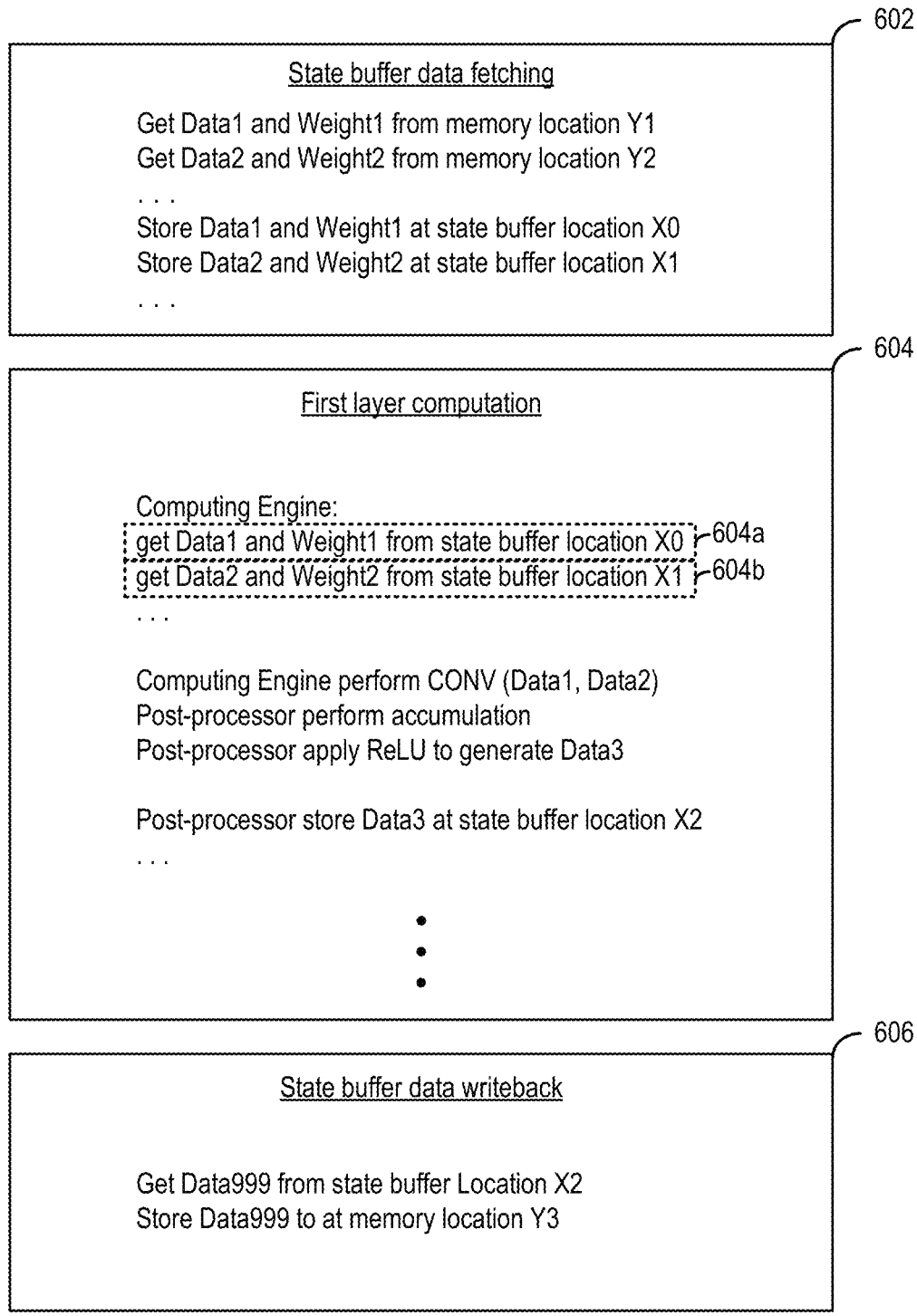
FIG. 6 illustrates an example of instructions that can be executed by the neural network processor of FIG. 5A and FIG. 5B, according to certain aspects of the present disclosure.

FIG. 6 illustrates an example of a set of instructions 600 that can be stored in instruction buffers 508. Instructions 600 can be generated based on, for example, compilation of instructions 298 of FIG. 2E to represent prediction model 103 of FIG. 2A, and can be encrypted to become encrypted executable instructions 516. Instructions 600 can be specific to the architecture of neural network processor 306 and comprise instructions specific for different components of neural network processor 306. For example, as shown in FIG. 6, instructions 600 comprise instructions 602 for transmitting of input data and weights data of state buffer 502 from memory device 514, instructions 604 for first layer computation (e.g., for input layer 207) comprising convolution operations at computing engine 504 and partial sum accumulation and activation function processing at post-processor 506, as well as instructions 606 for writing back of output data from state buffer 502 at memory device 514. The instructions can be executed sequentially following the order of the instructions. Although not shown in FIG. 6, it is understood that instructions 600 may also include instructions for computations at other layers (e.g., intermediate layers 209 and 211).

Returning back to FIG. 5A, neural network processor 306 further includes a key storage 530, an instruction decryption engine 532, and a data encryption/decryption engine 534. Key storage 530 can be an on-chip memory device and may include, for example, static random access memory (SRAM), and can store encryption keys for decrypting encrypted executable instructions 516, encrypted input data 518, encrypted weights data 520, and for encrypting output data to generate encrypted output data 522. The keys can be provided by key manager 324, which can be part of neural network processor 306 or external to the processor. Instruction decryption engine 532 can be controlled by controller 510 to use the corresponding encryption key to decrypt each encrypted instruction fetched from instruction buffer 508 prior to execution. Data encryption/decryption engine 534 can be controlled by controller 510 to decrypt encrypted weights data and input data stored at state buffer 502 before the weights data and input data are transmitted to computing engine 504 to support neural network computations. In addition, data encryption/decryption engine 534 can be controlled by controller 510 to encrypt intermediate output data or output data generated by post-processor 506 prior to transmitting the intermediate output data or output data to state buffer 502 for storage, and the encrypted output data can be written back by state buffer 502 to memory 514 as encrypted output data 522. By performing the decryption of instructions, weights data, and input data as well as encryption of output data locally at neural network processor 306, only encrypted data (e.g., instructions, weights data, input data, output data, etc.) can be transmitted between memory device 514 and neural network processor 306, which can enhance security and reduce the likelihood that an unauthorized user can intercept and gain access to these data during the transmission of these data. In some examples, the encryption of output data (e.g., to generate encrypted output data 522) and the decryption of encrypted input data (e.g., encrypted input data 518) can be based on the same encryption key.

In some examples, to further enhance security, the decryption of weights and/or input data can be performed in a just-in-time (JIT) manner so that the weights and/or input data remain encrypted until shortly before they are used for processing. For example, in some embodiments, weights data and input data are decrypted on a per-instruction basis. For example, referring back to instructions 604 of FIG. 6, controller 510 can, based on instruction 604a, control data encryption/decryption engine 534 to decrypt Data1 and Weight1, and then fetch decrypted Data1 and Weight1 to computing engine 504. Controller 510 can then, based on instruction 604b, control data encryption/decryption engine 534 to decrypt Data2 and Weight2, and then fetch decrypted Data2 and Weight2 to computing engine 504. With such arrangements, the duration of storage of decrypted weights and input data can be kept as minimum. The encrypted weights and input data can be decrypted only when they are needed for computations, which can reduce the likelihood that an unauthorized user can gain access to the decrypted input and weights data at neural network processor 306.

Figure 7:
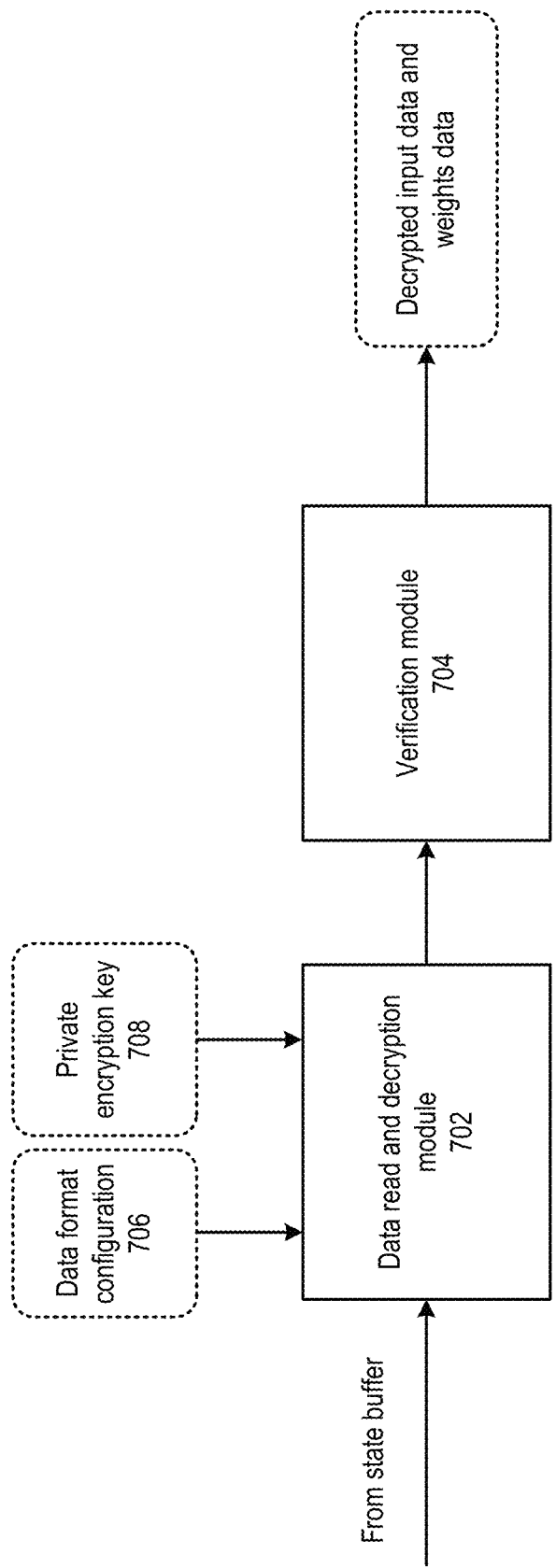
FIG. 7 illustrates an example of a decryption engine that can be part of the neural network processor of FIG. 5A and FIG. 5B, according to certain aspects of the present disclosure.

In some examples, data encryption/decryption engine 534 may be configurable and/or programmable to encrypt/decrypt data of different formats. The different formats may include, for example, a number of bits used to represent an input data element or a weight data element (e.g., whether each input data element or weight data element is an 8-bit number, a 16-bit number, a 32-bit number, etc.). The decryption path of data encryption/decryption engine 534 may also include feedback mechanisms to provide an indication of whether a decryption operation is successful. FIG. 7 illustrates an example of internal components of the decryption path of data encryption/decryption engine 534. As shown in FIG. 7, the decryption path may include a data read and decryption module 702 and a verification module 704. Data read and decryption module 702 may receive data format configuration 706 and encryption key 708. Data format configuration 706 may specify, for example, a number of bits used to represent an input data element or a weight data element. Based on data format configuration 706, data read and decryption module 702 can fetch the number of bits from state buffer 502, and perform decryption, using encryption key 708, on the number of bits fetched from state buffer 502. Verification module 704 can perform verification on the result of decryption based on various techniques. For example, the encrypted data fetched from state buffer 502 may include checksum information of the raw data. After decryption module 702 decrypts the encrypted data to obtain both the raw data and the checksum, verification module 704 can verify the raw data based on the checksum. If the verification result is positive, verification module 704 can forward the decrypted input data and weights data to computing engine 504. On the other hand, if the verification result is negative, verification module 704 can transmit an indication back to, for example, host device 302, access manger 320, etc., which may suspend the neural network processing and/or supply new encrypted data and/or keys to neural network processor 306 based on the indication.

In some examples, neural network processor 306 can include a component to perform a training operation to determine a set of weights data, which can then be used to perform inference in neural network processing (e.g., as part of an image recognition service of FIG. 1). Neural network processor 306 may include a training module 536 to perform the training operation. For example, neural network processor 306 may receive encrypted executable instructions 516 representing a neural network model and training data (not shown in FIG. 5A) labelled to produce a target output. For example, the training data may include input image data labelled as including a target object. Training module 536 can generate a set of weights data such that when the input image data and the set of weights data are provided to the neural network model, the model is more likely to output an indication that the input image data contain the target object. In some examples, training module 536 can update/generate the set of weights data iteratively based on an objective function to minimize a difference between the target output and the output of the model (e.g., to minimize loss), which may include multiple instances of storage and retrieval of temporary weights data at/from state buffer 502. To improve efficiency, training module 536 may store the temporary weights data at state buffer 502 in unencrypted form, such that the temporary weights data bypass data encryption/decryption engine 534 during the training operation. After the training operation completes, state buffer 502 can write back the trained weights data to memory device 514. The trained weights data can be encrypted using weight data encryption engine 538, which can be part of DMA engine 512 or between DMA engine 512 and state buffer 502. The encrypted trained weights data can then be stored at memory device 514 using DMA engine 512.

In the example of FIG. 5A, two different trust boundaries can be defined between a neural network processing operation (e.g., of input data) and a training operation, and the different trust boundaries may determine whether a component of neural network processor 306 has access to decrypted data. For example, for a neural network processing operation of input data, controller 510, computing engine 504, and post-processor 506 can be designated to be within a first trust boundary such that these components can have access to decrypted instructions (for controller 510), and decrypted input data and weights data (for computing engine 504 and post-processor 506). On the other hand, state buffer 502 and instruction buffer 508 are outside the first trust boundary and must store data (e.g., weights, input data, instructions data, etc.) in encrypted form. But for a training operation, state buffer 502 (in addition to controller 510, computing engine 504, and post-processor 506) can be designated to be within a second trust boundary with respect to weights data, which enables training module 536 to bypass data encryption/decryption engine 534 and to store weights data in unencrypted form at state buffer 502. On the other hand, memory device 514 can be designated as outside both the first and second trust boundaries and can only store data (instructions, input data, weights data, etc.) in encrypted form.

FIG. 5B illustrates another example of neural network processor 306 having a different trust boundary than the ones of FIG. 5A. In the example of FIG. 5B, in addition to controller 510, computing engine 504, and post-processor 506, state buffer 502 and instruction buffer 508 can be within a trust boundary, which allows both buffers to store data (e.g., instruction data, weights, and input data) in unencrypted form, while memory device 514 remains outside of the trusted boundary. An encryption/decryption engine 540 can be included in DMA engine 512 or between DMA engine 512 and state buffer 502 and instruction buffer 508, to provide decrypted instructions, weights, and input data to the buffers, and to encrypt the output data so that the output data is in encrypted form when stored in memory device 514.

Figure 8:
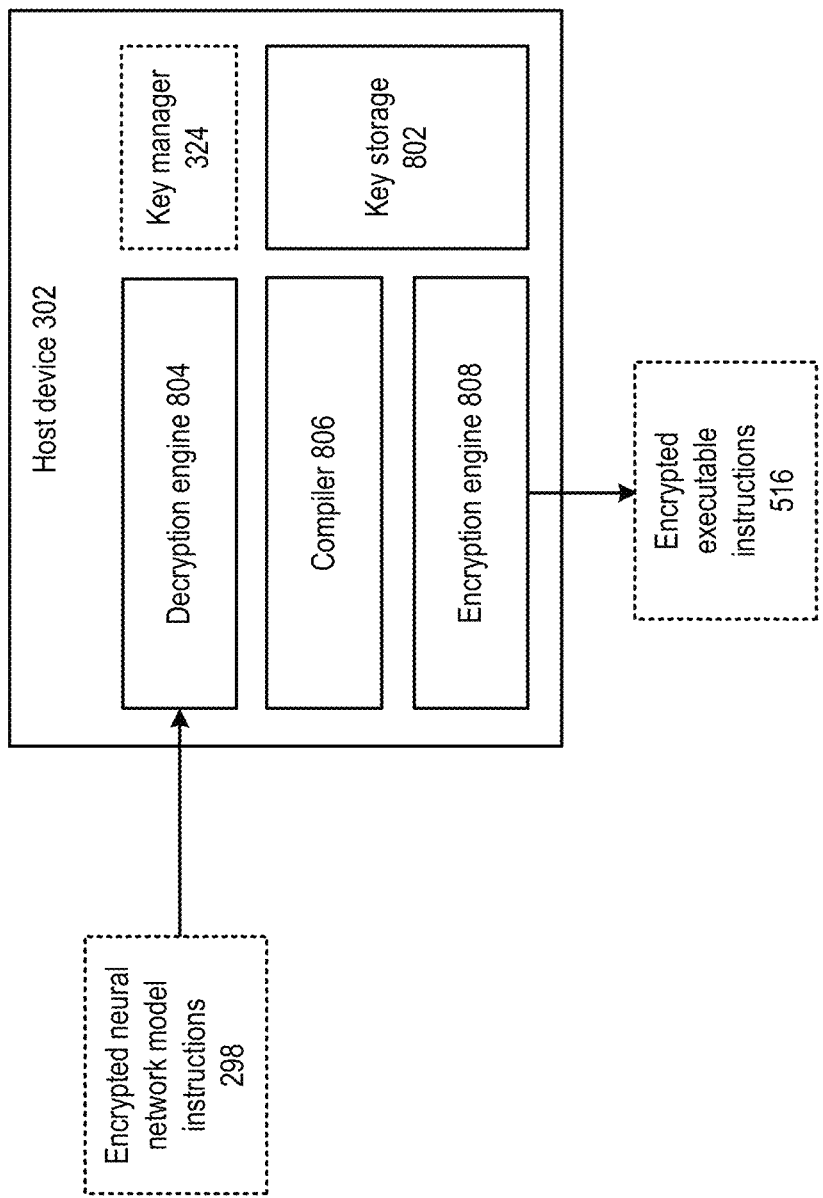
FIG. 8 illustrates an example of a host device that can be part of the computing environment of FIG. 3, according to certain aspects of the present disclosure.

FIG. 8 illustrates examples of internal components of host device 302. Host device 302 may be part of a server, a data center, etc. Host device 302 may include a memory device configured as key storage 802, as well as a hardware processor (not shown in FIG. 8) that can be configured to execute software instructions comprising a decryption engine 804, a compiler 806, and an encryption engine 808. The hardware processor may also execute software application 102 that interfaces with neural network processor 306 to perform neural network processing operations. Host device 302 may receive encrypted neural network model instructions (e.g., encrypted neural network model instructions 298) provided by access manager 320 based on a selection from a user for a neural network, as described above. Decryption engine 804 can decrypt encrypted neural network model instructions 298 based on an encryption key stored at key storage 802 and provided by key manager 324 (which can be part of host device 302 or external to the host device). Compiler 806 can parse the decrypted neural network model instructions and map the instructions to the resources at a neural network processor (e.g., neural network processor 306) to create a sequence of executable instructions (e.g., instructions 604) for the neural network processor. For example, compiler 806 can generate a set of instructions specific to the dimensions of computing engine 504 (e.g., number of rows and columns of processing elements) and to the computing resources available at neural network processor 306. Compiler 806 can also generate a set of instructions based on the memory resources needed to support the computations including, for example, instructions for transmitting inputs and weights data from an external memory (e.g., instructions 602) and instructions for writing back output data to the external memory (e.g., instructions 606). Encryption engine 808 can be controlled to encrypt the executable instructions to generate encrypted executable instructions (e.g., encrypted executable instructions 516), which can be stored in another memory device (e.g., memory device 514) for future retrieval by neural network processor 306.

Figure 9A:
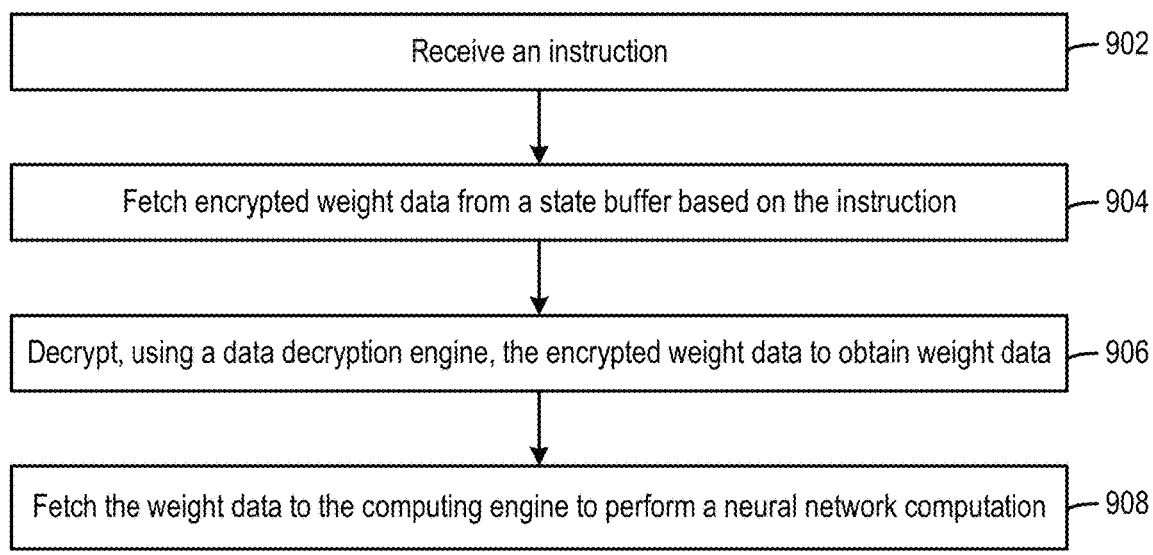
FIG. 9A and FIG. 9B illustrate an example flow diagram of performing neural network processing, according to certain aspects of the present disclosure.

FIG. 9A illustrates an example flow diagram of a process 900 for performing secured neural network processing. Process 900 may be implemented by, for example, neural network processor 306.

At operation 902, controller 510 may receive an instruction from instruction buffer 508. The instruction may include, for example, instruction 604a (or 604b) and may specify that one or more weights data elements are to be fetched from a location of state buffer 502 to computing engine 504 to perform a neural network computation. Instruction buffer 508 may receive the instruction from, for example, compiler 806, which generates the executable instruction based on data of a neural network topology (e.g., instructions 298). In some examples, the instruction may be encrypted, and controller 510 may use instruction decryption engine 532 to decrypt the encrypted instruction.

At operation 904, controller 510 may fetch the one or more encrypted weights data elements from state buffer 502 based on the instruction received at operation 902. For example, the instruction may specify the locations of the encrypted weights data, and controller 510 only fetches the weights data from the specified locations based on the instruction.

At operation 906, controller 510 may decrypt, using a data decryption engine (e.g., the decryption data path of data encryption/decryption engine 534), the encrypted weight data. The decryption can be based on encryption keys stored at key storage 530 and provided by key manager 324. Access manager 320 may provide a set of encrypted weights data to neural network processor 306 based on a selection from a user for using the set of weights data, and key manager 324 may also provide the encryption keys for decrypting the set of weights data to neural network processor 306 based on the selection.

In some examples, the decryption of the weights data can be configurable based on a data format of the weights data. For example, data encryption/decryption engine 534 may receive data format configuration information (e.g., data format configuration 706) which specifies a number of bits included in each weights data element, and data encryption/decryption engine 534 can be configured and/or programmed to decrypt the number of bits for each weights data element. Data encryption/decryption engine 534 may also perform verification on the decryption result (e.g., based on checksums included in the encrypted data) to verify that the decrypted weights data match the weights data prior to encryption, to ensure computing engine 504 receives the correct weights data.

At operation 908, controller 510 or data encryption/decryption engine 534 may fetch the decrypted weight data to computing engine 504 to perform the neural network computation. Controller 510 may also fetch the input data based on the instruction received in operation 902 from state buffer 502 and provide the input data to computing engine 504. In a case where the input data is encrypted, controller 510 may also use data encryption/decryption engine 534 to decrypt each input data element (e.g., based on data format configuration 706) and provide the decrypted input data elements to computing engine 504. Computing engine 504 can then perform the neural network computation based on the input data and weights data.

After transmitting the weights data, controller 510 may receive a second instruction. Controller 510 may fetch a second set of encrypted weights data based on the second instruction, decrypt the second set of encrypted weights data, and fetch the decrypted second set of weights data to computing engine 504.

Figure 9B:
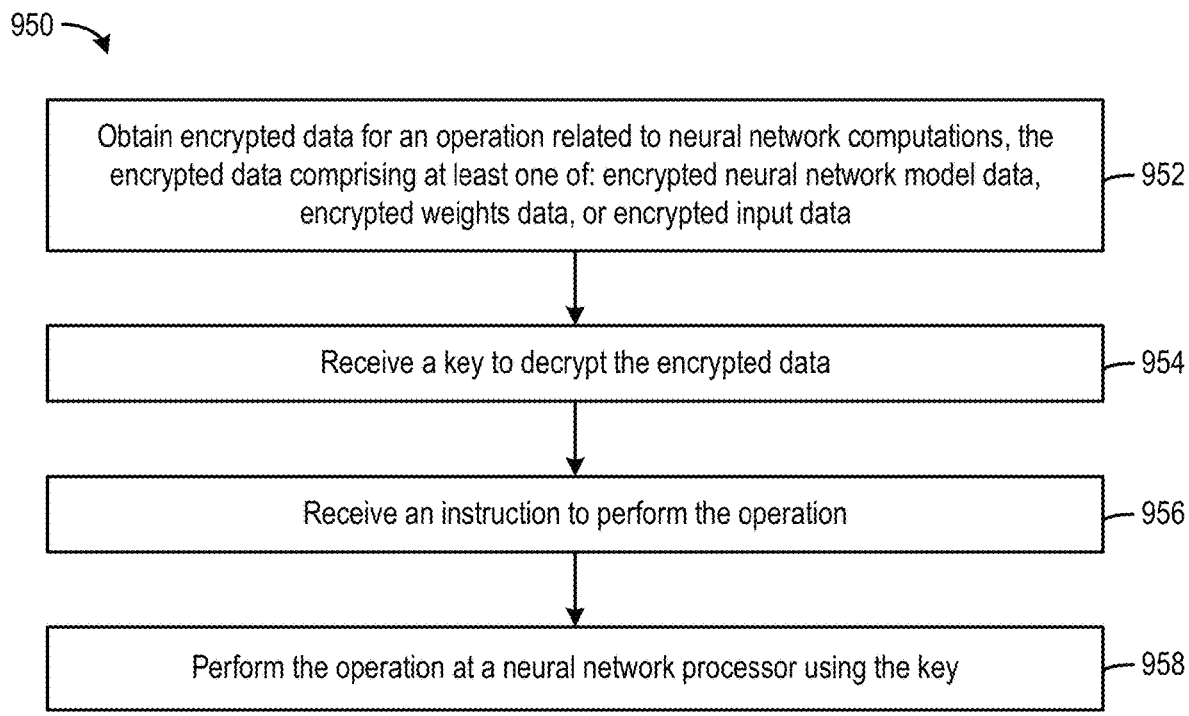

FIG. 9B illustrates an example flow diagram of a process 950 for performing secured neural network processing. Process 950 may be implemented by, for example, host device 302 and neural network processor 306.

At operation 952, host device 302 and neural network processor 306 may obtain encrypted data for an operation related to neural network computations, the encrypted data comprising at least one of: encrypted neural network model data, encrypted weights data, or encrypted input data. The operation may be performed for a compute service requested by a user operating a client device (e.g., client devices 307a, 307b, 307c, etc.). The compute service may include, for example, a data classification and/or inference process (e.g., to perform an image recognition task, an audio recognition task, etc.), a weights training process to generate weights for a subsequent data classification and/or inference process, etc. The encrypted data may be received from, for example, topology storage 308, input data storage 30, and weights data storage 312. Access manager 320 may refer to access database 321 and data structure 400 of FIG. 4A. Based on an access right list, access manager 320 may determine the neural network model and the weights accessible by the user, and can receive a selection from the user for the neural network model and the weights to be used for the operation. Based on the selection, access manager 320 can store the neural network model data, the weights data, and the input data to be processed, some or all of which can be encrypted, at a memory accessible to host device 302 and neural network processor 306. Neural network processor 306 can then obtain the encrypted data from the memory via, for example, a DMA engine.

At operation 954, at least one of host device 302 or neural network processor 306 may receive a key to decrypt the encrypted data. For example, in a case where the encrypted data include encrypted neural network model data, host device 302 may receive a key to decrypt the encrypted neural network model data to generate a set of instructions (e.g., instructions 600). In a case where the encrypted data include encrypted weights data and/or encrypted input data, neural network processor 306 may receive keys to decrypt the encrypted weights data and/or encrypted input data. Host device 302 and neural network processor 306 may receive the keys from key manager 324 based on the access right information in access database 321 and inputs from access manager 320.

At operation 956, host device 302 may receive an instruction to perform the operation. The instruction may be received from a software application hosted by host device 302 and via, for example, an API. The software application can include a classifier software application, and the operation may be related to a data classification and/or inference process (e.g., to perform an image recognition task, an audio recognition task, etc.), a weights training process to generate weights for a subsequent data classification and/or inference process, etc.

At operation 958, host device 302 can perform the operation at neural network processor 306 using the key received at operation 954. The operation comprises causing the neural network processor to use the key to decrypt the encrypted data and to use the decrypted data to perform the neural network computations, an example of which is described in FIG. 5A.

Figure 10:
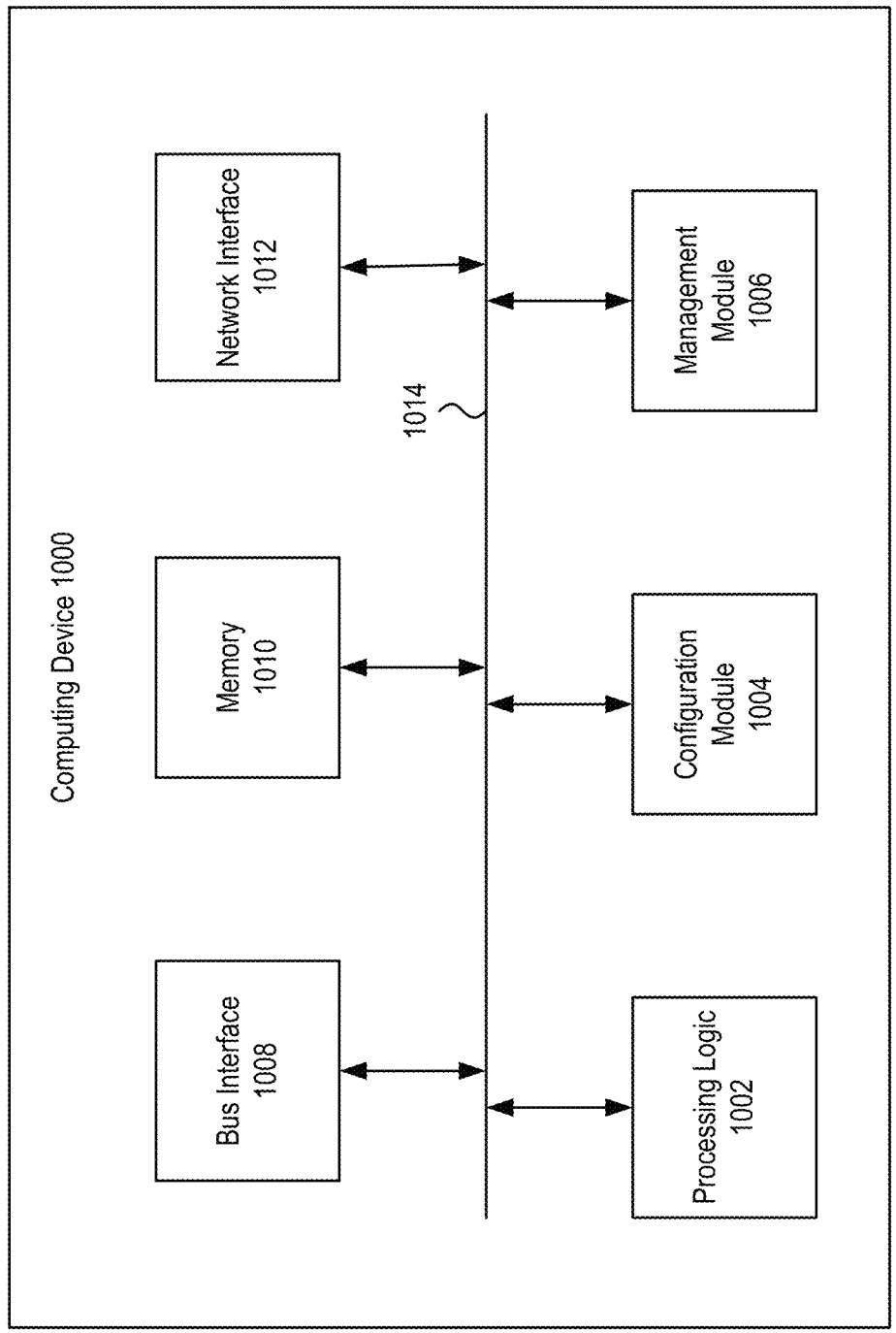
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations. A computing device 1000 may perform computations to facilitate processing of a task. As an illustrative example, computing device 1000 can be part of a server in a multi-tenant compute service system. Various hardware and software resources of computing device 1000 (e.g., the hardware and software resources associated with provision of an image recognition service) can be allocated to a client upon request.

In one example, the computing device 700 may include processing logic 1002, a bus interface module 1008, memory 1010, and a network interface module 1012. These modules may be hardware modules, software modules, or a combination of hardware and software. In certain instances, modules may be interchangeably used with components or engines, without deviating from the scope of the disclosure.

The computing device 1000 may include additional modules, not illustrated here. In some implementations, the computing device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010. Processing logic 1002 may also include hardware circuities for performing artificial neural network computation including, for example, host device 302, service manager 304, neural network processor 306, etc.

The access to processing logic 1002 can be granted to a client to provide the personal assistant service requested by the client. For example, computing device 1000 may host a virtual machine, on which an image recognition software application can be executed. The image recognition software application, upon execution, may access processing logic 1002 to predict, for example, an object included in an image. As another example, access to processing logic 1002 can also be granted as part of bare-metal instance, in which an image recognition software application executing on a client device (e.g., a remote computer, a smart phone, etc.) can directly access processing logic 1002 to perform the recognition of an image.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the computing device 1000, while in other cases some or all of the memory may be external to the computing device 1000. The memory 1010 may store an operating system comprising executable instructions that, when executed by the processing logic 1002, provides the execution environment for executing instructions providing networking functionality for the computing device 1000. The memory 1010 may also store, for example, software applications for performing artificial neural network computation. For example, memory 1010 may store software routines related to the computations of the equations above. In a case where processing logic 1002 is in the form of FPGA, memory 1010 may store netlists data representing various logic circuit components of processing logic 1002. In some examples, memory 1010 can include memory device 514 and can be used to implement, for example, topology storage 308, input data storage 310, weights data storage 312, key storage 319, access database 321, key storage 802, etc.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 802.11 network, a cellular network, an Infiniband network, etc. In some embodiments, computing device 1000 may receive a set of parameters, such as the aforementioned weight vectors for generation of forget gate factor, input factor, output factor, etc. from a server through network interface module 1012.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A neural network hardware processor, comprising:
an instruction buffer that stores encrypted instructions associated with a neural network model;
a state buffer that stores encrypted input data and encrypted weights data for computations for the neural network model;
a computing engine configured to perform the computations;
an instruction decryption engine configured to decrypt the encrypted instructions;
a data decryption engine configured to decrypt the encrypted input data and the encrypted weights data;
a controller configured to:
obtain a first encrypted instruction associated with the neural network model from the instruction buffer;
decrypt, using the instruction decryption engine, the first encrypted instruction to obtain a first instruction;
responsive to obtaining the first instruction:
fetch first encrypted input data and first encrypted weights data from the state buffer to the data decryption engine;
decrypt, using the data decryption engine, the first encrypted input data and the first encrypted weights data to obtain, respectively, first input data and first weights data;
fetch, from the data decryption engine, the first input data and the first weights data to the computing engine; and
cause the computation engine to perform first computations on the first input data and the first weights data to generate first output data, the first output data being related to the first input data based on a topology of the neural network model;
obtain a second encrypted instruction from the instruction buffer;
decrypt, using the instruction decryption engine, the second encrypted instruction to obtain a second instruction; and
based on the second instruction:
fetch second encrypted input data and second encrypted weights data from the state buffer to the data decryption engine;
decrypt, using the data decryption engine, the second encrypted input data and the second encrypted weights data to obtain, respectively, second input data and second weights data;

fetch the second input data and the second weights data to the computing engine; and
cause the computation engine to perform second computations on the second input data and the second weights data to generate second output data, the second output data being related to the second input data based on the topology of the neural network model.

2. The neural network hardware processor of claim 1, wherein:
the encrypted instructions are encrypted using a first key;
the encrypted input data are encrypted using a second key;
the encrypted weights data are encrypted using a third key;
the encrypted instructions and the first key are provided by a first device associated with a first entity;
the encrypted input data and the second key are provided by a second device associated with a second entity; and
the encrypted weights data and the third key are provided by a third device associated with a third entity.

3. The neural network hardware processor of claim 2, further comprising a secure memory device configured to store the first key, the second key, and the third key,
wherein the secure memory device is configured to destroy the first key, the second key, and the third key responsive to receiving an unauthorized access to the secure memory device.

4. The neural network hardware processor of claim 1, wherein the data decryption engine is programmable to read a number of bits from the state buffer to decrypt each data element of the first encrypted input data, the second encrypted input data, the first encrypted weights data, and the second encrypted weights data; and
wherein the number of bits is programmed according to a format of the data element.

5. The neural network hardware processor of claim 1, further comprising:
a post-processor configured to perform post-processing of intermediate outputs of the computing engine; and
a data encryption engine;
wherein the controller is further configured to:
obtain a third encrypted instruction from the instruction buffer;
decrypt, using the instruction decryption engine, the third encrypted instruction to obtain a third instruction;
based on the third instruction:
perform post-processing on a sum of first intermediate output data of the first computations and second intermediate output data of the second computations to generate output data;
encrypt, using the data encryption engine, the output data to generate encrypted output data; and
store the encrypted output data at the state buffer.

6. A system comprising:
a neural network hardware processor comprising:
an instruction decryption engine configured to:
receive an encrypted instruction associated with a neural network model; and
decrypt the encrypted instruction into a first instruction;
a state buffer that stores input data and weights; and
a computing engine configured to, responsive to receiving the first instruction, execute the first instruction to:
fetch the input data and the weights from the state buffer; and
perform computations of neural network processing based on applying the neural network model to the input data and the weights.

7. The system of claim 6, further comprising a controller and a data decryption engine; and
wherein the controller is configured to:
receive the first instruction associated with the neural network model from the instruction decryption engine;
receive a second instruction associated with the neural network model from the instruction decryption engine;
responsive to receiving the first instruction:
cause first encrypted weights data to be transferred from the state buffer to the data decryption engine;
cause the data decryption engine to decrypt the first encrypted weights data to obtain first weights data;
cause the first weights data to be transferred to the computing engine; and
cause the computing engine to perform a first computation of the computations on the first weights data to generate first output data, the first computation being defined in the first instruction and being based on a topology of the neural network model; and
responsive to receiving the second instruction:
cause second encrypted weights data to be transferred from the state buffer to the data decryption engine;
cause the data decryption engine to decrypt the second encrypted weights data to obtain second weights data; and
cause the second weights data to be transferred to the computing engine; and
cause the computing engine to perform a second computation of the computations on the second weights data to generate second output data, the second computation being defined in the first instruction and being based on the topology of the neural network model.

8. The system of claim 7, further comprising a second memory that stores first encrypted input data and second encrypted input data;
wherein the controller is configured to:
responsive to receiving the first instruction:
cause the state buffer to obtain the first encrypted input data from the second memory;
cause the first encrypted input data to be transferred from the state buffer to the data decryption engine;
cause the data decryption engine to decrypt the first encrypted input data to obtain first input data;
cause the first input data to be transferred to the computing engine; and
cause the computing engine to perform the first computation on the first input data and the first weights data to generate the first output data, the first output data being related to the first input data based on the topology of the neural network model; and
responsive to receiving the second instruction:
cause the state buffer to obtain the second encrypted input data from the second memory;
cause the second encrypted input data to be transferred from the state buffer to the data decryption engine;

cause the data decryption engine to decrypt the second encrypted input data to obtain second input data;
cause the second input data to be transferred to the computing engine; and
cause the computing engine to perform the second computation on the second input data and the second weights data to generate the second output data, the second output data being related to the second input data based on the topology of the neural network model.

9. The system of claim 7, wherein the data decryption engine is programmable to read a number of bits from the state buffer to decrypt each data element of encrypted first weights data and encrypted second weights data; and
wherein the number of bits is programmed according to a format of the data element.

10. The system of claim 7, wherein:
the first encrypted weights data and the second encrypted weights data include checksum information;
the data decryption engine is configured to:
verify the first weights data and the second weights data based on the checksum information; and
transmit an indication of verification result to the controller.

11. The system of claim 7, further comprising a second memory that stores encrypted instructions;
wherein the neural network hardware processor comprises an instruction buffer;
wherein the controller is configured to:
cause the instruction buffer to obtain the encrypted instructions from the instruction buffer;
cause the encrypted instructions to be transferred from the instruction buffer to the instruction decryption engine; and
cause the instruction decryption engine to decrypt the encrypted instructions to obtain instructions.

12. The system of claim 11, further comprising a compiler, a model decryption engine, and an instruction encryption engine;
wherein the model decryption engine is configured to receive encrypted information about the neural network model and decrypt the encrypted information to generate information about a topology of the neural network model;
wherein the compiler is configured to generate instructions based on the information; and
wherein the instruction encryption engine is configured to encrypt the instructions to generate the encrypted instructions and to store the encrypted instructions at the second memory.

13. The system of claim 12, wherein the compiler is hosted in a host processor; and
wherein the host processor, the neural network hardware processor, and the second memory are part of a cloud infrastructure.

14. The system of claim 7, further comprising a second memory to store a weight key for decrypting the encrypted first weights data and encrypted second weights data; and
wherein the second memory is configured to destroy the weight key responsive to detecting unauthorized access to the second memory.

15. The system of claim 14, wherein the neural network hardware processor further comprises a key storage buffer; and
wherein the controller is configured to:

cause the key storage buffer to obtain the weight key from the second memory; and
cause the data decryption engine to decrypt, based on the weight key obtained from the key storage buffer, the encrypted first weights data and encrypted second weights data.

16. The system of claim 14, further comprising a key manager configured to:
transmit a public key of the key manager to an entity that provides the encrypted first weights data and encrypted second weights data;
receive an encrypted weight key from the entity, the encrypted weight key being encrypted using the public key of the key manager;
receive the encrypted first weights data and encrypted second weights data from the entity, the encrypted first weights data and encrypted second weights data being encrypted using the weight key;
decrypt the encrypted weight key to obtain the weight key;
store the weight key at the second memory; and
store the encrypted first weights data and encrypted second weights data at a third memory.

17. The system of claim 6, further comprising an access manager configured to:
receive, from a user device associated with a first user, a request for performing neural network processing;
determine an access right of the first user with respect to a plurality of neural network models and a plurality of sets of weights data;
select, based on the access right, a subset of the plurality of neural network models and a subset of the plurality of sets of weights data;
transmit, to the user device, information of the subset of the plurality of neural network models and the subset of the plurality of sets of weights data available for fulfilling the request;
receive, from the user device, a first selection of the neural network model from the plurality of neural network models and a second selection of a set of weights data from the plurality of sets of weights data;
retrieve, based on the first selection and the second selection, encrypted instructions associated with the neural network model and encrypted weights data from a second memory; and
transmit the encrypted instructions and the encrypted weights data to the neural network hardware processor to fulfill the request.

18. A method comprising:
receiving a first encrypted instruction associated with a neural network model;
decrypting, using an instruction decryption engine, the first encrypted instruction to obtain a first instruction;
responsive to the first instruction:
fetching first weights data from a state buffer; and
controlling a computing engine to perform a first neural network computation using the first weights data, the first neural network computation being defined in the first instruction and being based on a topology of the neural network model;
receiving a second encrypted instruction associated with the neural network model;
decrypting, using the instruction decryption engine, the second encrypted instruction to obtain a second instruction;
responsive to the second instruction:
fetching second weights data from the state buffer; and controlling the computing engine to perform a second neural network computation using the second weights data, the second neural network computation being defined in the second instruction and being based on the topology of the neural network model.

19. The method of claim 18, further comprising:

responsive to receiving the first encrypted instruction:
fetching first encrypted input data from the state buffer;
decrypting, using a data decryption engine, the first encrypted input data to obtain first input data; and
controlling the computing engine to perform the first neural network computation on the first input data to generate first output data, the first output data being related to the first input data based on the topology of the neural network model; and responsive to receiving the second encrypted instruction:
fetching second encrypted input data from the state buffer;
decrypting, using the data decryption engine, the second encrypted input data to obtain second input data; and
controlling the computing engine to perform the second neural network computation on the second input data to generate second output data, the second output data being related to the second input data based on the topology of the neural network model.

20. A method comprising:

receiving encrypted data for an operation related to neural network computations, the encrypted data comprising encrypted neural network model data including a set of instructions that reflect a topology of a neural network model;

receiving a key to decrypt the encrypted data; and
performing the operation at a hardware neural network processor using the key, wherein performing the operation comprises causing the hardware neural network processor to: use the key to decrypt the encrypted data to obtain the set of instructions, to fetch input data and weights data based on the set of instructions, and to perform the neural network computations on the input data and the weights data based on the set of instructions.

21. A system comprising:

a neural network hardware processor comprising:
a controller;
a computing engine;
a data decryption engine configured to:
receive encrypted data for an instruction of a neural network model, wherein the encrypted data includes encrypted weights data and checksum information;
decrypt the encrypted data to generate decrypted weights data;
verify the decrypted weights data based on the checksum information; and
transmit an indication of verification result to the controller, wherein the controller is configured to, based on receiving the indication, enable the computing engine to execute the instruction to perform computations on input data based on the neural network model and using the decrypted weights data.

* * * * *